(12) United States Patent
Okada et al.

(10) Patent No.: US 9,511,555 B2
(45) Date of Patent: Dec. 6, 2016

(54) TIRE VULCANIZER-UNLOADING DEVICE AND TIRE VULCANIZER

(71) Applicant: MITSUBISHI HEAVY INDUSTRIES MACHINERY TECHNOLOGY CORPORATION, Hiroshima-shi, Hiroshima (JP)

(72) Inventors: Shinji Okada, Hiroshima (JP); Mitsuru Morita, Hiroshima (JP); Shinya Goto, Hiroshima (JP); Keiichi Tohmoto, Hiroshima (JP); Jiro Agawa, Hiroshima (JP)

(73) Assignee: MITSUBISHI HEAVY INDUSTRIES MACHINERY TECHNOLOGY CORPORATION, Hiroshima-Shi, Hiroshima (JP)

( * ) Notice: Subject to any disclaimer, the term of this patent is extended or adjusted under 35 U.S.C. 154(b) by 0 days.

(21) Appl. No.: 14/760,920

(22) PCT Filed: Jun. 17, 2013

(86) PCT No.: PCT/JP2013/066563
§ 371 (c)(1),
(2) Date: Jul. 14, 2015

(87) PCT Pub. No.: WO2014/128987
PCT Pub. Date: Aug. 28, 2014

(65) Prior Publication Data
US 2015/0343729 A1      Dec. 3, 2015

(30) Foreign Application Priority Data

Feb. 22, 2013   (JP) .................................. 2013-033810

(51) Int. Cl.
*B29D 30/06*      (2006.01)
*B29D 30/00*      (2006.01)
(Continued)

(52) U.S. Cl.
CPC ....... *B29D 30/0603* (2013.01); *B29D 30/0016* (2013.01); *B29D 30/0643* (2013.01);
(Continued)

(58) Field of Classification Search
CPC ............ B29D 30/0603; B29D 30/0643; B29D 2030/0027
(Continued)

(56) References Cited

U.S. PATENT DOCUMENTS 3,343,208 A * 9/1967 Pacciarini et al. . B29D 30/0603
414/626
4,169,698 A * 10/1979 Turk et al. ......... B29D 30/0643
425/24

(Continued)

FOREIGN PATENT DOCUMENTS

CN    100404224 C    7/2008
JP    H07-096526 A   4/1995
(Continued)

OTHER PUBLICATIONS

PCT/ISA/210, "International Search Report for International Application No. PCT/JP2013/066563," Aug. 27, 2013.
(Continued)

*Primary Examiner* — James Mackey
(74) *Attorney, Agent, or Firm* — Manabu Kanesaka; Benjamin Hauptman; Kenneth Berner

(57) ABSTRACT

The tire vulcanizer is provided with an unloading device. The unloading device removes a vulcanized tire that has been vulcanized in the main body of the vulcanizer and conveys same to a cooling position at which the vulcanized tire is cooled, and conveys the vulcanized tire that has been cooled at the cooling position to a discharge position for transfer to an exporting device for discharging the vulcanized tire. The unloading device is provided with a support (Continued)

section capable of supporting the vulcanized tire, a rotational movement section for rotating the support section in a plane, and a linear movement section for moving the support section linearly.

8 Claims, 20 Drawing Sheets

(51) Int. Cl.
*B65G 65/00* (2006.01)
*B65G 47/90* (2006.01)
*B29K 105/24* (2006.01)

(52) U.S. Cl.
CPC ........... *B65G 47/904* (2013.01); *B65G 65/00* (2013.01); *B29D 2030/0027* (2013.01); *B29K 2105/24* (2013.01); *B65G 2201/0273* (2013.01)

(58) Field of Classification Search
USPC .................................................. 425/38, 58.1
See application file for complete search history.

(56) References Cited

U.S. PATENT DOCUMENTS

| | | | | |
|---|---|---|---|---|
| 4,702,669 A * | 10/1987 | Ichikawa et al. .. | B29D 30/0603 | 198/468.6 |
| 5,492,464 A * | 2/1996 | Irie ................... | B29D 30/0605 | 425/34.1 |
| 5,681,594 A * | 10/1997 | Irie ...................... | B29C 31/006 | 425/28.1 |
| 5,683,726 A * | 11/1997 | Mitamura et al. ...... | B29C 33/24 | 425/34.1 |
| 5,741,528 A | 4/1998 | Amano et al. | | |
| 6,241,501 B1 | 6/2001 | Mitamura | | |
| 6,318,950 B1 | 11/2001 | Ureshino et al. | | |
| 6,890,165 B2 * | 5/2005 | Ichimaru ............ | B29D 30/0016 | 425/38 |
| 7,744,359 B2 * | 6/2010 | Himeno et al. .... | B29D 30/0016 | 425/38 |
| 8,029,256 B2 * | 10/2011 | Aikawa et al. .... | B29D 30/0601 | 425/34.1 |
| 8,337,187 B2 * | 12/2012 | Hineno et al. ..... | B29D 30/0016 | 425/38 |
| 8,366,426 B2 * | 2/2013 | Singh et al. ....... | B29D 30/0643 | 425/38 |
| 8,821,782 B2 * | 9/2014 | Ichinose ............ | B29D 30/0603 | 264/236 |
| 2004/0013755 A1 | 1/2004 | Ichimaru | | |

FOREIGN PATENT DOCUMENTS

| | | |
|---|---|---|
| JP | H07-314452 A | 12/1995 |
| JP | H07-314455 A | 12/1995 |
| JP | H08-300357 A | 11/1996 |
| JP | 2896108 B2 | 5/1999 |
| JP | H11-268039 A | 10/1999 |
| JP | 3340560 B2 | 11/2002 |
| JP | 3657421 B2 | 6/2005 |
| TW | 260636 B | 10/1995 |

OTHER PUBLICATIONS

PCT/ISA/237, "Written Opinion of the International Searching Authority for International Application No. PCT/JP2013/066563," Aug. 27, 2013.
Taiwan Patent Office, "Office Action for Taiwan Patent Application No. 102128466," Jan. 20, 2016.
Europe Patent Office, "Search Report for European Patent Application No. 13875688.7," Jan. 21, 2016.
China Patent Office, "Office Action for Chinese Patent Application No. 201380069209.7," Jun. 2, 2016.

* cited by examiner

FIG. 4
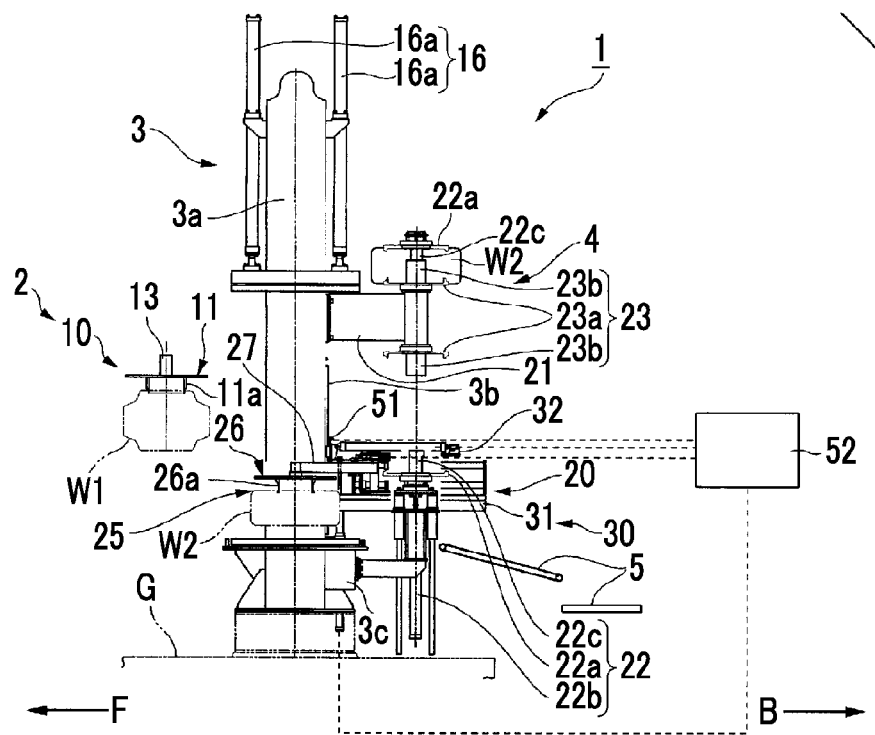
(a)
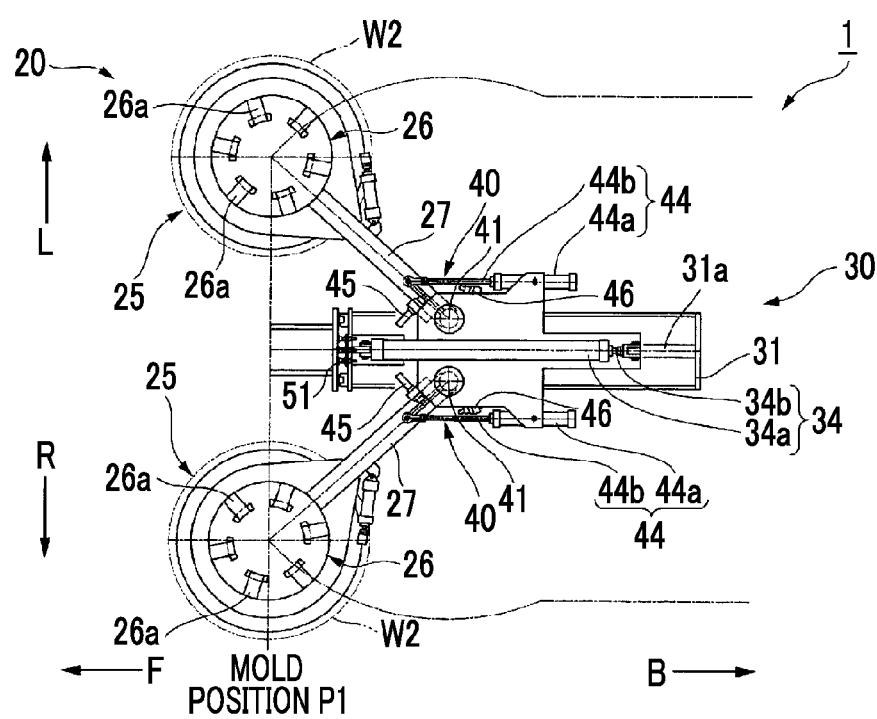
(b)
MOLD POSITION P1

FIG. 17
(a)
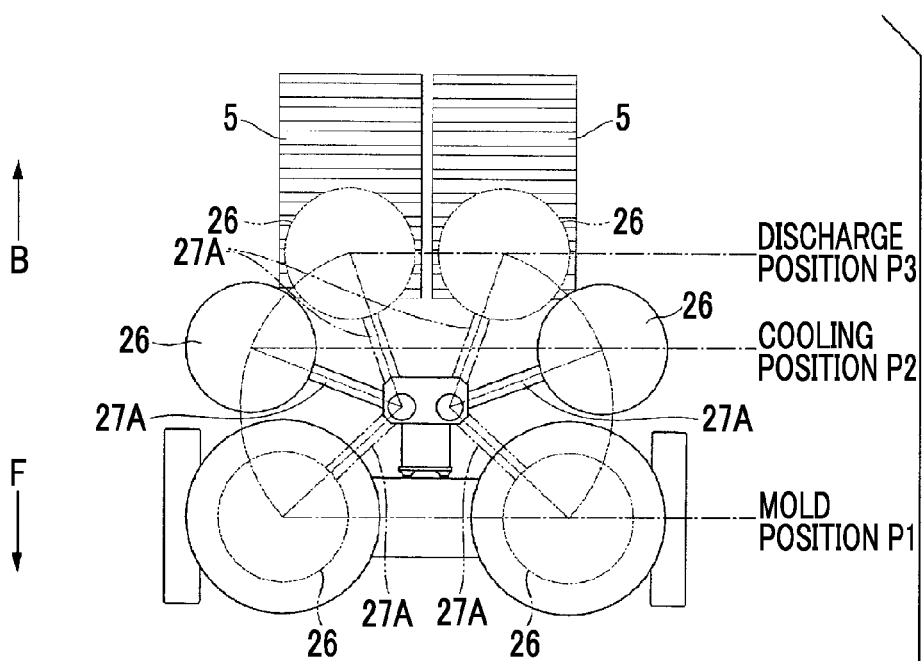
(b)
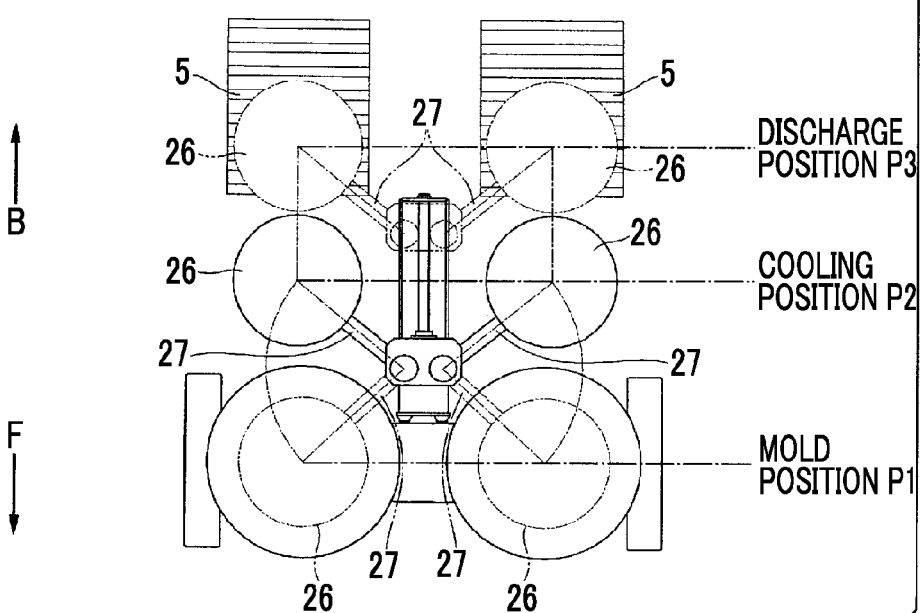

TIRE VULCANIZER-UNLOADING DEVICE AND TIRE VULCANIZER

RELATED APPLICATIONS

The present application is National Phase of International Application No. PCT/JP2013/066563 filed Jun. 17, 2013, and claims priority from Japanese Application No. 2013-033810, filed Feb. 22, 2013, the disclosure of which is hereby incorporated by reference herein in its entirety.

TECHNICAL FIELD

The present invention relates to an unloading device which transports a vulcanized tire in a tire vulcanizer, and a tire vulcanizer including the same.

Priority is claimed on Japanese Patent Application No. 2013-033810, filed Feb. 22, 2013, the content of which is incorporated herein by reference.

BACKGROUND ART

In the related art, a tire vulcanizer in which a tire made of raw rubber formed in advance into a shape close to a finished product is put into a mold, and the tire is subjected to a vulcanization process by applying heat and pressure to the tire so as to be finished into a shape of a finished tire is known.

In the tire vulcanizer, a cooling device which receives the vulcanized tire from the mold and cools the vulcanized tire, and an unloading device which transfers the vulcanized tire to a discharge conveyor are provided. As the unloading device, for example, there is a device described in PTL 1. This device transports the tire between the position of the mold, the position of a post-cure inflator (cooling device), and the position of the discharge conveyor by rotating a turning arm while gripping the vulcanized tire.

CITATION LIST

Patent Literature

[PTL 1] Japanese Unexamined Patent Application Publication No. H11-268039

SUMMARY OF INVENTION

Technical Problem

However, as described in PTL 1, the mold, the post-cure inflator (cooling device), and the discharge conveyor need to be arranged so that the positions thereof where the tire is received and transferred are on the same rotational path of the turning arm of the unloading device. In addition, the mold, the post-cure inflator (cooling device), and the discharge conveyor need to be arranged at positions where they do not interfere with each other during the processing of the tire. Therefore, due to the two limitations regarding the arrangement, the length dimension of the turning arm is determined. Accordingly, further reduction in the length dimension of the turning arm is difficult, and it is difficult to achieve a further compact size of the tire vulcanizer using the same structure. In addition, regarding a particularly large size tire, the amount of the tire protruding outward from the vulcanizer during the rotation of the turning arm is increased. Therefore, in a case where a plurality of tire vulcanizers are arranged, the installation pitch therebetween needs to be wide, and thus space saving is also difficult.

The present invention has been made taking foregoing problems into consideration, and an object thereof is to provide an unloading device of a tire vulcanizer capable of achieving a compact size and space saving, and a tire vulcanizer.

Solution to Problem

In order to solve the problems, according to each aspect of the present invention, the following means is employed.

That is, as an aspect of the present invention, an unloading device of a tire vulcanizer in which a vulcanized tire vulcanized by a vulcanizer main body is taken out of a mold installed in the vulcanizer main body and is transported to a cooling position at which the vulcanized tire is cooled, and the vulcanized tire cooled at the cooling position is transported to a discharge position for transfer to an exporting device for discharging the vulcanized tire, includes: a support section which is able to support the vulcanized tire; a rotational movement section which rotates the support section in a plan view; and a linear movement section which linearly moves the support section.

Here, the rotational center of the support section may be positioned outside the support section. In addition, the rotational movement of the support section and the linear movement of the support section may be performed on the same virtual plane or on virtual planes parallel to each other.

According to the unloading device, when the vulcanized tire is supported and transported by the support section, transportation as a combination of rotational movement and linear movement can be achieved by the rotational movement section and the linear movement section. Therefore, unlike in a case where the vulcanized tire is transported only by rotational movement, there is no need to arrange the position of the mold installed in the vulcanizer main body, the cooling position, and the discharge position on the same rotational path, and this positional arrangement increases the degree of freedom. Accordingly, even when the position where the vulcanized tire is supported by the support section approaches the rotational center of the rotational movement section, the device components at each of the position of the mold installed in the vulcanizer main body, the cooling position, and the discharge position and the vulcanized tire at each of the positions do not interfere with each other, and the vulcanized tire can be transported to the positions. Therefore, the rotational radius of the support section is suppressed, and thus the width dimension of the tire vulcanizer can be reduced. In addition, when a plurality of tire vulcanizers are installed to be adjacent to each other, the installation pitch therebetween can be reduced, and the tires output can be increased within the same spatial area. In addition, for example, a length dimension to the rotational center of the support section can be reduced, and thus a reduction in the cost of materials for the support section is possible. Furthermore, since the length dimension of the support section can be reduced as described above, a reduction in the bending moment is possible, and thus strength required of the peripheral members that support the rotational center of the support section in the rotational movement section can be suppressed, resulting in a reduction in the weight and the cost of materials for the tire vulcanizer. In addition, since the rotational radius of the support section is suppressed to be small, time needed for the transportation of the vulcanized tire can be reduced, and thus the cycle time during tire production can be reduced, resulting in an increase in the tires output.

The linear movement section may be able to move along a direction toward the discharge position from the vulcanizer main body, and the rotational movement section may be rotatably supported by the linear movement section.

Since the rotational movement section is supported by the linear movement section as described above, movement as a combination of rotational movement and linear movement can be realized with a simple structure. Therefore, while suppressing the rotational radius of the support section to be small, the transportation of the vulcanized tire from the mold of the vulcanizer main body to the discharge position is possible.

The rotational movement section may rotate the vulcanized tire from a position where the vulcanized tire is taken out of the mold, to the cooling position, and the linear movement section linearly may move the vulcanized tire from the cooling position to the discharge position.

By combining rotational movement and linear movement as described above, the transportation of the vulcanized tire from the mold of the vulcanizer main body to the cooling position and the discharge position is possible while suppressing the rotational radius of the rotational movement to be small.

In addition, since the movement from the position of the mold to the cooling position is rotational movement, in a case where a swing cylinder is used in the rotational movement section, the stroke of the cylinder can be reduced. That is, if the movement from the position of the mold to the cooling position is linear movement, the vulcanized tire needs to be linearly moved to a position where the external shape of the mold does not interfere with the vulcanized tire, and thus in a case where a slide cylinder is used in the linear movement section, the stroke of the cylinder is increased. Therefore, by setting the movement from the position of the mold to the cooling position to rotational movement, there are advantages in terms of space saving and cost.

An elevating section which vertically elevates the linear movement section may also be included.

Since the elevating section is provided as described above, the degree of freedom in the movement paths of the support section, the rotational movement section, and the linear movement section is increased.

A detection unit which detects a height position of the linear movement section; and a controller which controls the elevating section on the basis of the height position detected by the detection unit may also be included.

Since the elevating section is controlled by detecting the height position at the detection unit, the support section, the rotational movement section, and the linear movement section can be positioned at appropriate positions in the height direction.

As another aspect of the present invention, an unloading device of a tire vulcanizer in which a vulcanized tire vulcanized by a vulcanizer main body is taken out of a mold installed in the vulcanizer main body and is transported to a cooling position at which the vulcanized tire is cooled, and the vulcanized tire cooled at the cooling position is transported to a discharge position for transfer to an exporting device for discharging the vulcanized tire, includes: a support section which is able to support the vulcanized tire; and a linear movement section which linearly moves the support section.

According to the unloading device, the vulcanized tire can be transported without rotating the support section, and thus the width dimension of the tire vulcanizer can be reduced, resulting in a compact size. In addition, when a plurality of tire vulcanizers are installed to be adjacent to each other, the installation pitch therebetween in the width direction can be reduced, and thus space saving in the width direction can be achieved.

A tire vulcanizer of the present invention includes: any one of the above-described unloading device; a vulcanizer main body which performs vulcanization on a green tire which is not vulcanized; a post-cure inflator which cools the vulcanized tire vulcanized by the vulcanizer main body, at the cooling position; and an exporting device for discharging the vulcanized tire cooled at the cooling position.

According to the tire vulcanizer described above, since the unloading device is provided, the width dimension of the tire vulcanizer can be reduced compared to a case where the transportation to the cooling position or the discharge position is performed only by rotational movement. In addition, the installation pitch between the tire vulcanizers can be reduced, and the tires output can be increased within the same spatial area.

Furthermore, the post-cure inflator may be fixed to the vulcanizer main body.

Therefore, the vulcanizer main body and the post-cure inflator can be installed to be close to each other, and thus further reduction in the installation space is possible.

Advantageous Effects of Invention

In the aspect of the present invention, since the support section is moved by a combination of the rotational movement section and the linear movement section or by the linear movement section, a compact size of the devices and space saving can be achieved.

BRIEF DESCRIPTION OF DRAWINGS

FIG. 4 relates to the tire vulcanizer according to the embodiment of the present invention and illustrates a state where the vulcanized tire is supported by a support section after the end of vulcanization in a vulcanizer main body, in which FIG. 4(a) is a side view and FIG. 4(b) is a partial plan view.

FIG. 6 relates to the tire vulcanizer according to the embodiment of the present invention and illustrates a state after the vulcanized tire is transported to a cooling position, in which FIG. 6(a) is a side view and FIG. 6(b) is a partial plan view.

FIG. 8 relates to the tire vulcanizer according to the embodiment of the present invention and illustrates a state where the support section is evacuated after the vulcanized tire is set in a lower rim elevating device of the post-cure inflator, in which FIG. 8(a) is a side view and FIG. 8(b) is a partial plan view.

FIG. 17 illustrates the relationship between the arrangement positions of vulcanized tires in a tire vulcanizer, in which FIG. 17(a) illustrates a case where an unloading device is formed only by a rotational movement section, and FIG. 17(b) is a partial plan view of the tire vulcanizer according to the embodiment of the present invention and illustrates a simplified form of FIG. 2.

DESCRIPTION OF EMBODIMENTS

Hereinafter, a tire vulcanizer according to an embodiment of the present invention will be described.

Figure 1:
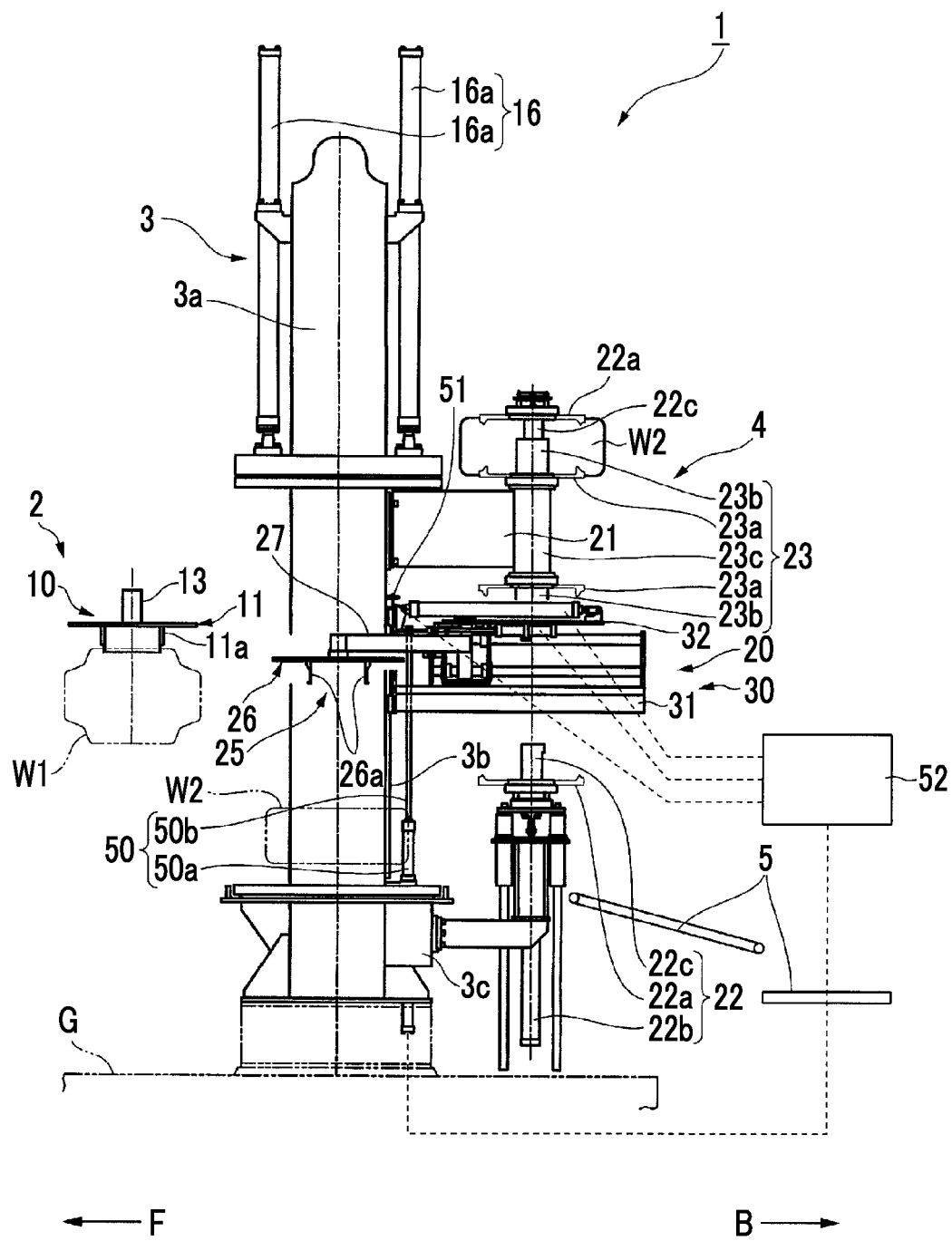
FIG. 1 is a side view of a tire vulcanizer according to an embodiment of the present invention and illustrates a state at the end of a vulcanization process at a vulcanization position.
Figure 2:
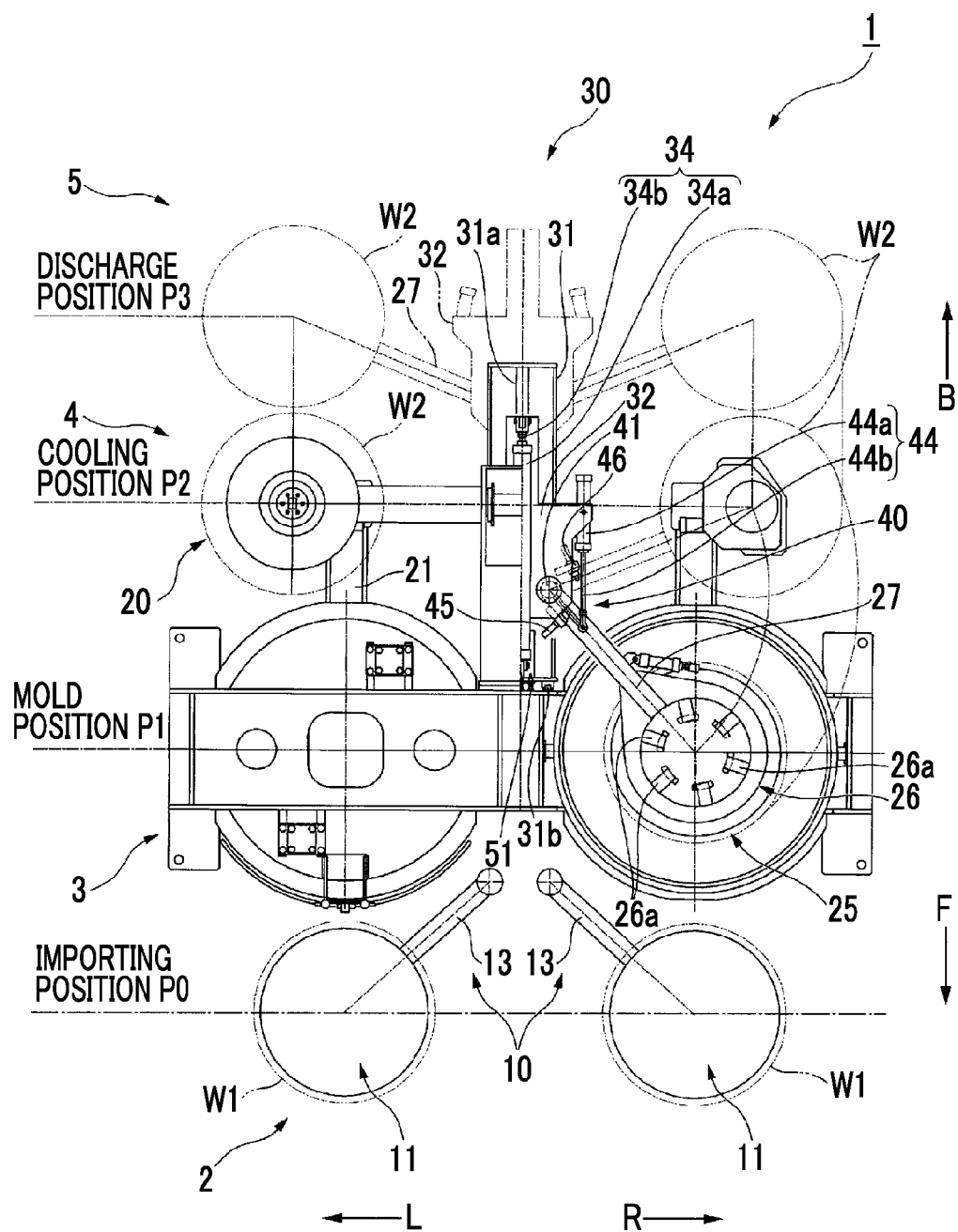
FIG. 2 is a partial cutaway plan view illustrating the tire vulcanizer according to the embodiment of the present invention and illustrates the relationship between the arrangement positions of a green tire and a vulcanized tire in the tire vulcanizer.

As illustrated in FIGS. 1 and 2, a tire vulcanizer 1 of this embodiment imports an unvulcanized green tire W1 before a vulcanization process from the front side (on the left in FIG. 1), performs the vulcanization process thereon to produce a vulcanized tire W2, performs a cooling process on the vulcanized tire W2, and thereafter discharges the tire toward the rear side.

The tire vulcanizer 1 sequentially includes, from the front side toward the rear side, an importing device 2 which imports the green tire W1, a vulcanizer main body 3 which performs the vulcanization process on the green tire W1, a post-cure inflator 4 which cools the vulcanized tire W2 vulcanized by the vulcanizer main body 3, and an exporting device 5 which discharges the vulcanized tire W2 cooled by the post-cure inflator 4.

Furthermore, the tire vulcanizer 1 includes a loading device 10 which transfers the green tire W1 from the importing device 2 to the vulcanizer main body 3, and an unloading device 20 which transfers the vulcanized tire W2 from the vulcanizer main body 3 to the post-cure inflator 4 and the exporting device 5.

The importing device 2, the vulcanizer main body 3, the post-cure inflator 4, the exporting device 5, the loading device 10, and the unloading device 20 all have a bilaterally symmetrical structure and perform a bilaterally symmetrical operation. Here, the right and left directions are directions perpendicular to the forward and rearward directions. In the diagrams, the front side, the rear side, the left side, and the right side are respectively referred to as F, B, L, and R.

Hereinafter, as illustrated in FIG. 2, regarding the positions of the green tire W1 and the vulcanized tire W2 in the horizontal direction, a position where the green tire W1 is received by the importing device 2 is referred to as an importing position P0, the position of the green tire W1 and the vulcanized tire W2 in the vulcanizer main body 3 is referred to as a mold position P1, the position of the vulcanized tire W2 in the post-cure inflator 4 is referred to as a cooling position P2, and the position of the vulcanized tire W2 in the exporting device 5 is referred to as a discharge position P3.

Although not illustrated in detail, the importing device 2 is disposed on the foremost side of the tire vulcanizer 1 and prepares the green tire W1 produced outside the tire vulcanizer 1.

The loading device 10 includes a pair of loading chucks 11 which respectively support the green tires W1, and loading arms 13 which respectively support the loading chucks 11 and extend toward the center position in the right and left directions. The loading chucks 11 and the loading arms 13 are provided to be vertically displaced along guides (not illustrated).

Each of the loading chucks 11 includes a claw 11a (see FIG. 1) which is squeezed into the inside of a bead of the green tire W1 from above and widens so as to hook the inner periphery of the bead along the entire periphery. The loading chuck 11 grips the inner peripheral side of the green tire W1 prepared in the importing device 2 and supports and raises the green tire W1.

The loading arms 13 horizontally rotate the pair of loading chucks 11 on a horizontal plane in a direction in which the loading chucks 11 become separated from each other about the end portions thereof on the center position side as the rotational centers. In addition, as a mechanism that rotates the loading arm 13, for example, the same mechanism as that of rotational movement sections 40 of the unloading device 20, which will be described later, may be used.

Figure 10:
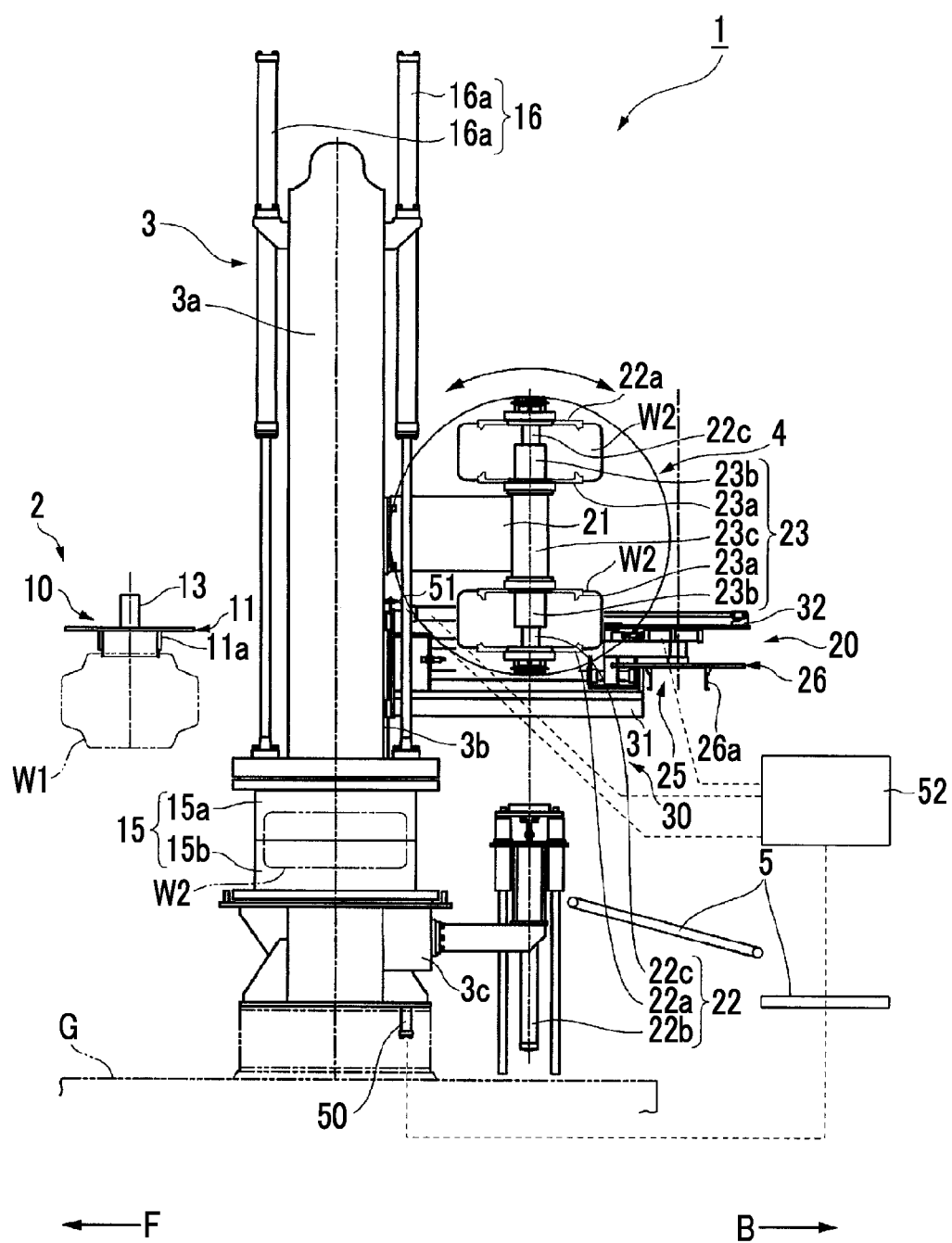
FIG. 10 is a side view of the tire vulcanizer according to the embodiment of the present invention and illustrates a state where a cooling process of the vulcanized tire is performed in the post-cure inflator.

As illustrated in FIG. 10, the vulcanizer main body 3 includes a mold 15 for the green tire W1, a guide frame 3a which stands upright from a floor G, a guide rail 3b which is provided in the guide frame 3a, a mounting portion 3c provided in the guide frame 3a, and an upper mold elevating device 16 which is provided in the guide frame 3a. The mold 15 includes a lower mold 15b and an upper mold 15a. The green tire W1 received from the loading device 10 is interposed between the upper mold 15a and the lower mold 15b and is accommodated in the mold 15. The vulcanizer main body 3 performs the vulcanization process by heating and pressurizing the green tire W1 in a state in which a bladder (not illustrated) is inserted into the green tire W1 and presses against the inner surface of the green tire W1.

In this embodiment, although the mold 15 which is employed is metal, the mold is not limited to being metal.

The upper mold 15a is supported by the upper mold elevating device 16. The upper mold elevating device 16 includes a cylinder 16a which is provided in the guide frame 3a standing upright from the floor G and is able to extend and retract in the upward and downward directions. The lower mold 15b is fixed so as to be unable to move relative to the guide frame 3a, and before the start of the vulcanization process or after the end of the vulcanization process, the mold 15 is opened by moving the upper mold 15a upward.

The post-cure inflator 4 is disposed on the rear side of the vulcanizer main body 3 and is fixed to the guide frame 3a of the vulcanizer main body 3.

The post-cure inflator 4 includes support frames 21 which are fixed to the guide frame 3a and extend rearward, upper tire holding sections 23 which are provided on the support frame 21, and lower tire holding sections 22 which are fixed to the guide frame 3a and are disposed below the upper tire holding section 23. The post-cure inflator 4 includes two support frames 21, two upper tire holding sections 23, and two lower tire holding sections 22. Each of the two support frames 21, the two upper tire holding sections 23, and the two lower tire holding sections 22 are arranged in bilateral symmetry.

The lower tire holding section 22 is fixed to the guide frame 3a to oppose the upper tire holding section 23 and extends upward to a position where the lower tire holding section 22 does not interfere with the upper tire holding section 23.

The lower tire holding section 22 includes a lower rim 22a which is provided on the upper end portion thereof and receives the vulcanized tire W2 from the vulcanizer main body 3 so as to be fixed to the upper portion of the lower rim 22a, and a lower rim elevating device 22b which vertically elevates the lower rim 22a. In addition, the lower rim elevating device 22b includes, for example, an elevating cylinder, and has a function of controlling the elevation of the elevating cylinder may be included in a controller 52, which will be described later, and may be separately provided.

The upper tire holding section 23 includes an arm 23c which is provided to rotate about the support frame 21 as the rotational center, and upper rims 23a which are respectively provided at both end portions of the arm 23c. The two upper rims 23a are the same distance from the rotational center of the arm 23c. That is, the two upper rims 23a are symmetrical to each other with respect to the rotational center of the arm 23c. In addition, the upper tire holding section 23 can be rotated to be vertically inverted about the support frame 21 as the rotational center, and after receiving the vulcanized tire W2 from the lower tire holding section 22, introduces compressed air into the vulcanized tire W2 to perform the cooling process thereon.

Although not illustrated in detail, the exporting device 5 includes a conveyor. The conveyor is disposed to be tilted downward in the rearward direction on the rear side of the post-cure inflator 4 and discharges the vulcanized tire W2 subjected to the cooling process onto a main conveyor along the tilt for transportation to a subsequent process. The exporting device 5 includes a pair of conveyors. One conveyor and the other conveyor constituting the pair of conveyors are arranged in bilateral symmetry.

Figure 3:
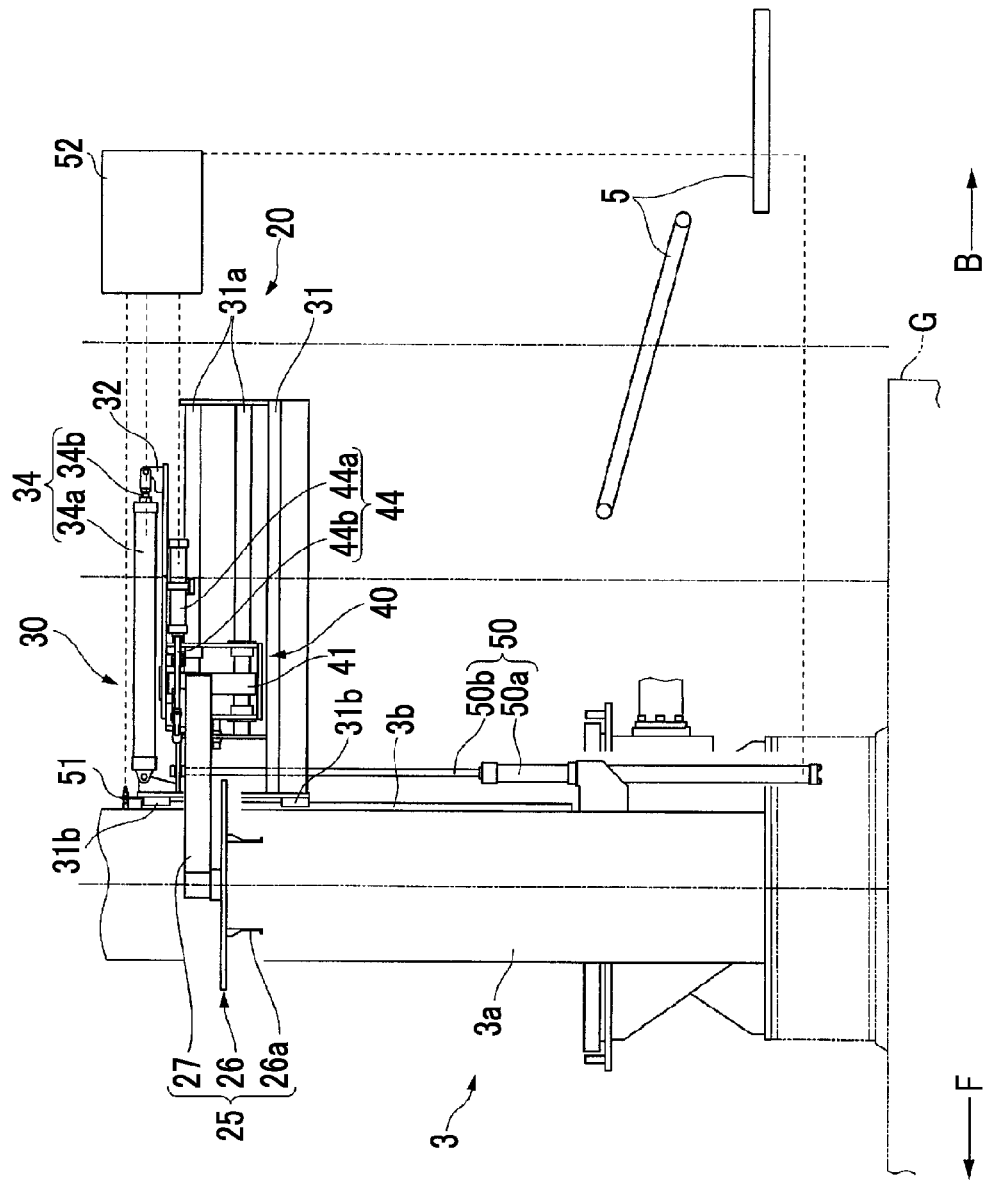
FIG. 3 is a side view of the tire vulcanizer according to the embodiment of the present invention and illustrates main parts of FIG. 1.

Next, the unloading device 20 will be described. As illustrated in FIGS. 3, 4(a), and 4(b), the unloading device 20 includes support sections 25 which support the vulcanized tire W2, the rotational movement sections 40 which rotate the support sections 25 on the horizontal plane, and a linear movement section 30 which linearly moves the support section 25 in the forward and rearward directions on the horizontal plane. The unloading device 20 includes two support sections 25 and two rotational movement sections 40. The two support sections 25 are arranged in bilateral symmetry with respect to the linear movement section 30, and the two rotational movement sections 40 are also arranged in bilateral symmetry with respect to the linear movement section 30.

Each of the support sections 25 includes an unloading chuck 26 which supports the vulcanized tire W2, and an unloading arm 27 which supports the unloading chuck 26 and extends toward the center position in the right and left directions.

The unloading chuck 26 includes a claw 26a which is squeezed into the inside of the bead of the vulcanized tire W2 from above and widens so as to hook the inner periphery of the bead along the entire periphery. The unloading chuck 26 grips the inner peripheral side of the vulcanized tire W2 from the vulcanizer main body 3 and supports and raises the vulcanized tire W2.

The unloading arms 27 horizontally rotate the pair of loading chucks 26 on the horizontal plane in a direction in which the unloading chucks 26 become separated from each other about the end portions thereof on the center position side as the rotational center.

The linear movement section 30 includes a base 31 which is mounted on the guide frame 3a of the vulcanizer main body 3 and is provided to extend rearward, a slider 32 which is provided above the base 31 and is able to advance and retract, and a slide cylinder 34 which is interposed between the slider 32 and the base 31.

The base 31 includes an elevating guide 31b provided at the front end portion thereof on the front side. As the elevating guide 31b meshes with the guide rail 3b that is mounted on the rear side of the guide frame 3a and extends in the upward and downward directions, the base 31 is slidably elevated relative to the guide frame 3a in the upward and downward directions.

In addition, the base 31 includes a plurality of (in this embodiment, two) bar-shaped slide guides 31a (see FIG. 3) which extend in the forward and rearward directions and are vertically arranged with an interval therebetween.

The slider 32 is disposed above the base 31 and is provided to penetrate through the slide guides 31a of the base 31 and slide in the forward and rearward directions relative to the base 31 while being guided by the slide guides 31a.

The slide cylinder 34 includes a first cylinder main body 34a and a first rod 34b which is able to extend and retract in the forward and rearward directions with respect to the first cylinder main body 34a, the first cylinder main body 34a is mounted at a front position in the base 31, and the end portion of the first rod 34b is mounted to the slider 32. As the slide cylinder 34, for example, a hydraulic cylinder or the like is used to enable the slider 32 to linearly move in the forward and rearward directions with respect to the base 31 as the first rod 34b extends and retracts. In the linear movement section 30, as another linear movement means which can slide, a ball screw, a rack gear and a pinion gear, and a combined mechanism of a chain and a motor such as a sprocket may also be used for the movement. Here, the specification of the slide cylinder 34 is determined so that the vulcanized tire W2 positioned at the cooling position P2 can be supported in a state where the first rod 34b is shortest, and the vulcanized tire W2 supported by the support section 25 can be positioned at the discharge position P3 in a state where the first rod 34b is longest. That is, the linear movement section 30 linearly moves the vulcanized tire W2 from the cooling position P2 to the discharge position P3.

Each of the two rotational movement sections 40 is provided on the slider 32 of the linear movement section and includes a support pin 41 that fixes the end portion of the unloading arm 27 on the center position side and extends in the upward and downward directions and a swing cylinder 44 which is interposed between an intermediate position of the unloading arm 27 in the extension direction thereof and the slider 32. The support pin 41 of one rotational movement section 40 and the support pin 41 of the other rotational movement section 40 in the two rotational movement sections 40 are arranged in bilateral symmetry. In addition, the swing cylinder 44 of one rotational movement section 40 and the swing cylinder 44 of the other rotational movement section 40 in the two rotational movement sections 40 are arranged in bilateral symmetry.

Furthermore, the rotational movement section 40 includes a first stopper 45 which restricts, as illustrated in FIG. 4(b), when the vulcanized tire W2 supported by the support section 25 is positioned at the mold position P1, a forward operation of the unloading arm from the mold position P1, and a second stopper 46 which restricts, as illustrated in FIG. 6(b), when the vulcanized tire W2 is positioned at the cooling position P2, a rearward operation of the unloading arm 27 from the cooling position P2. The first stopper 45 of one rotational movement section 40 and the first stopper 45 of the other rotational movement section 40 in the two rotational movement sections 40 are arranged in bilateral symmetry. In addition, the second stopper 46 of one rotational movement section 40 and the second stopper 46 of the other rotational movement section 40 in the two rotational movement sections 40 are arranged in bilateral symmetry.

Each of the support pins 41 is provided to rotate relative to the slider 32 about the upward and downward directions as the rotation axis, and the unloading arm 27 rotates about the rotation axis.

Each of the swing cylinders 44 includes a second cylinder main body 44a, and a second rod 44b which is able to extend and retract in the forward and rearward directions with respect to the second cylinder main body 44a. The second cylinder main body 44a is mounted at a position closer to the rear side than the support pin 41 in the slider 32. The end portion of the second rod 44b extends forward from the second cylinder main body 44a and is mounted at an intermediate position of the unloading arm 27 in the extension direction thereof. As the swing cylinder 44, for example, a hydraulic cylinder or the like is used to enable the unloading arm 27 to rotate about the rotation axis of the support pin 41 as the second rod 44b extends and retracts.

Each of the first stoppers 45 is fixed to a plate-like member mounted on the front end portion of the slider 32. The first stopper 45 is a mechanical stopper which restricts the movement of the support section 25 so as not to allow the support section 25 to move forward from the mold position P1 as the front side of the unloading arm 27 abuts the first stopper 45.

Each of the second stoppers 46 is fixed to a plate-like member mounted on the rear end portion of the slider 32. The second stopper 46 is the same mechanical stopper as the first stopper 45, which restricts the movement of the support section 25 so as not to allow the support section 25 to move rearward from the cooling position P2 as the rear side of the unloading arm 27 abuts the second stopper 46.

That is, due to the first stopper 45 and the second stopper 46, the rotational movement section 40 can rotate the vulcanized tire W2 from the mold position P1 to the cooling position P2 and position the vulcanized tire W2 at the mold position P1 and the cooling position P2 with good accuracy.

In this manner, the rotational movement section 40 is supported by the linear movement section 30 to take the vulcanized tire W2 out of the mold 15 and rotate the vulcanized tire W2 from the mold position P1 to the cooling position P2. That is, the rotational movement section 40 is provided integrally with the linear movement section 30.

As illustrated in FIG. 1, the unloading device 20 further includes an elevating section 50 which can move the linear movement section 30 in the upward and downward directions, a detection unit 51 which detects the height position of the linear movement section 30, and the controller 52 which adjusts the height position of the linear movement section 30 according to a signal of the detection unit 51.

The elevating section 50 is an elevating cylinder which is interposed between the guide frame 3a of the vulcanizer main body 3 and the base 31 of the linear movement section 30. In addition, the elevating section includes an elevating cylinder main body 50a and an elevating rod 50b which is able to extend and retract in the upward and downward directions with respect to the elevating cylinder main body 50a.

The elevating cylinder main body 50a is mounted on the mounting portion 3c provided at the lower position in the guide frame 3a. In addition, an end portion of the elevating rod 50b is mounted at the front position of the base 31. The base 31 of the linear movement section 30 is slidably elevated in the upward and downward directions in a state where the elevating guide 31b meshes with the guide rail 3b as the elevating rod 50b extends and retracts.

The detection unit 51 is a sensor that detects the height position of the linear movement section 30. As the detection unit 51, for example, a proximity switch, a limit switch, or a linear sensor may be used. The detection unit 51 outputs a signal indicating that the linear movement section 30 has a predetermined height position at each of the mold position P1, the cooling position P2, and the discharge position P3. Specifically, regarding each of the mold position P1, the cooling position P2, and the discharge position P3, at a height position where the vulcanized tire W2 can be supported, or at a height position where the vulcanized tire W2 is transported from the mold position P1 to the cooling position P2 or from the cooling position P2 to the discharge position P3, the detection unit 51 outputs a signal indicating each of the heights.

The controller 52 controls the height position of the linear movement section 30 at the mold position P1, the cooling position P2, and the discharge position P3 by supplying power to the elevating section 50 and operating the elevating section 50 according to the detection signal from the detection unit 51. Accordingly, the vulcanized tire W2 can be supported by the support section 25 at each of the positions, and reception or transportation of the vulcanized tire W2 by the loading device 10 and the unloading device 20 between the devices at each of the positions can be performed.

Here, the controller 52 supplies power to the swing cylinder 44 to operate the swing cylinder 44 according to the detection signal from the detection unit 51 at a predetermined timing set in advance, thereby rotating the support section 25 from the mold position P1 to the cooling position P2. In addition, the controller 52 supplies power to the slide cylinder 34 to operate the slide cylinder 34, thereby linearly moving the support section 25 from the cooling position P2 to the discharge position P3.

Next, an operation of the tire vulcanizer 1 will be described with reference to the drawings.

The green tire W1 transported from the importing device 2 to the mold position P1 of the vulcanizer main body 3 by the loading device 10 is subjected to the vulcanization process in the mold 15.

Thereafter, as illustrated in FIG. 1, when the vulcanization process of the green tire W1 is ended, the upper mold 15*a* is moved upward by the upper mold elevating device 16 and thus the mold 15 is opened. At this time, the support section 25 is moved to the mold position P1 so that the unloading chuck 26 of the unloading device 20 is positioned above the vulcanized tire W2.

In addition, as illustrated in FIGS. 4(*a*) and 4(*b*), the controller 52 drives the elevating section 50 to move the base 31 of the linear movement section 30 downward on the basis of the detection result of the detection unit 51 such that the claw 26*a* is squeezed into the bead of the vulcanized tire W2 disposed on the lower mold 15*b*. Thereafter, by widening the claw 26*a*, the claw 26*a* is hooked on the bead such that the vulcanized tire W2 is supported by the support section 25.

Figure 5:
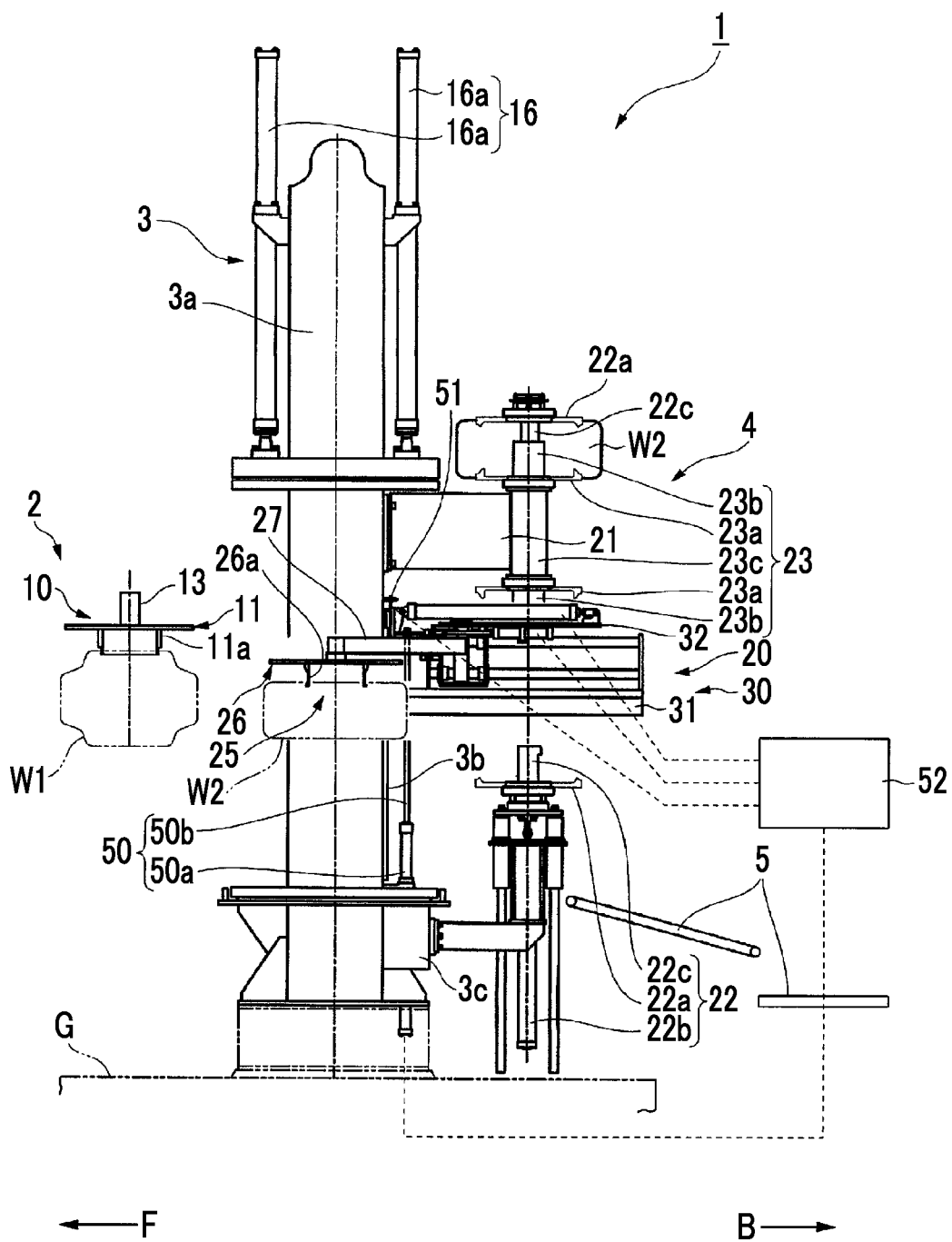
FIG. 5 is a side view of the tire vulcanizer according to the embodiment of the present invention and illustrates a state where the vulcanized tire is transported after the end of the vulcanization process in the vulcanizer main body.

Next, in a state where the vulcanized tire W2 is supported by the support section 25 as described above, the controller 52 drives the elevating section 50 on the basis of the detection result of the detection unit 51 to move the base 31 of the linear movement section 30 upward at the mold position P1 as illustrated in FIG. 5.

Figure 6:
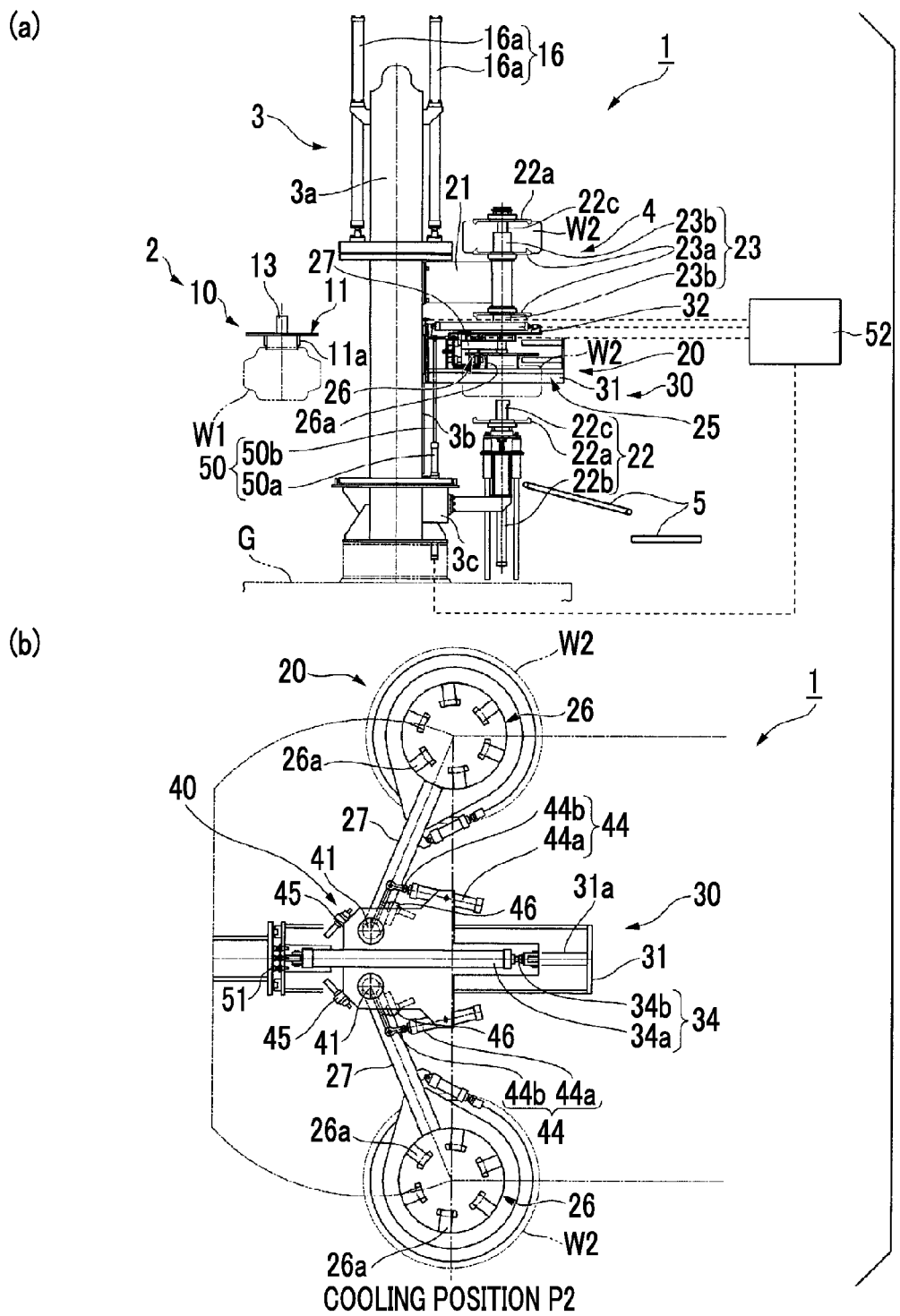

In the state where the vulcanized tire W2 is supported by the support section 25, the controller 52 drives the swing cylinder 44 of the rotational movement section 40 to move the support section 25 to the cooling position P2 as illustrated in FIGS. 6(*a*) and 6(*b*).

Figure 7:
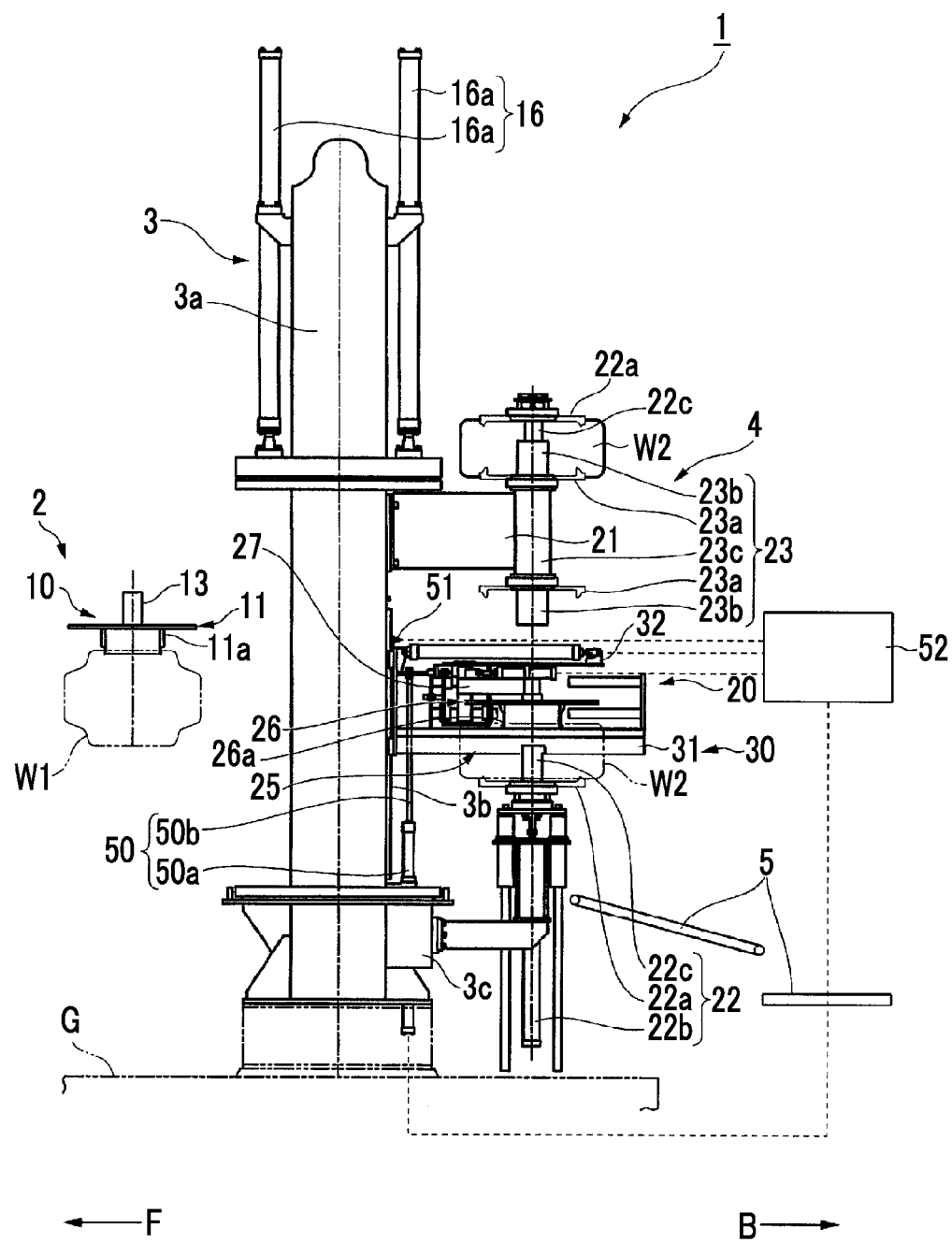
FIG. 7 is a side view of the tire vulcanizer according to the embodiment of the present invention and illustrates a state where the vulcanized tire is set in a post-cure inflator at the cooling position.

Next, in the state where the vulcanized tire W2 is supported by the support section 25, the controller 52 drives the elevating section 50 on the basis of the detection result of the detection unit 51 to move the base of the linear movement section 30 downward at the cooling position P2 as illustrated in FIG. 7. In addition, the vulcanized tire W2 is transferred to the lower rim 22*a* of the lower tire holding section 22 of the post-cure inflator 4.

Figure 8:
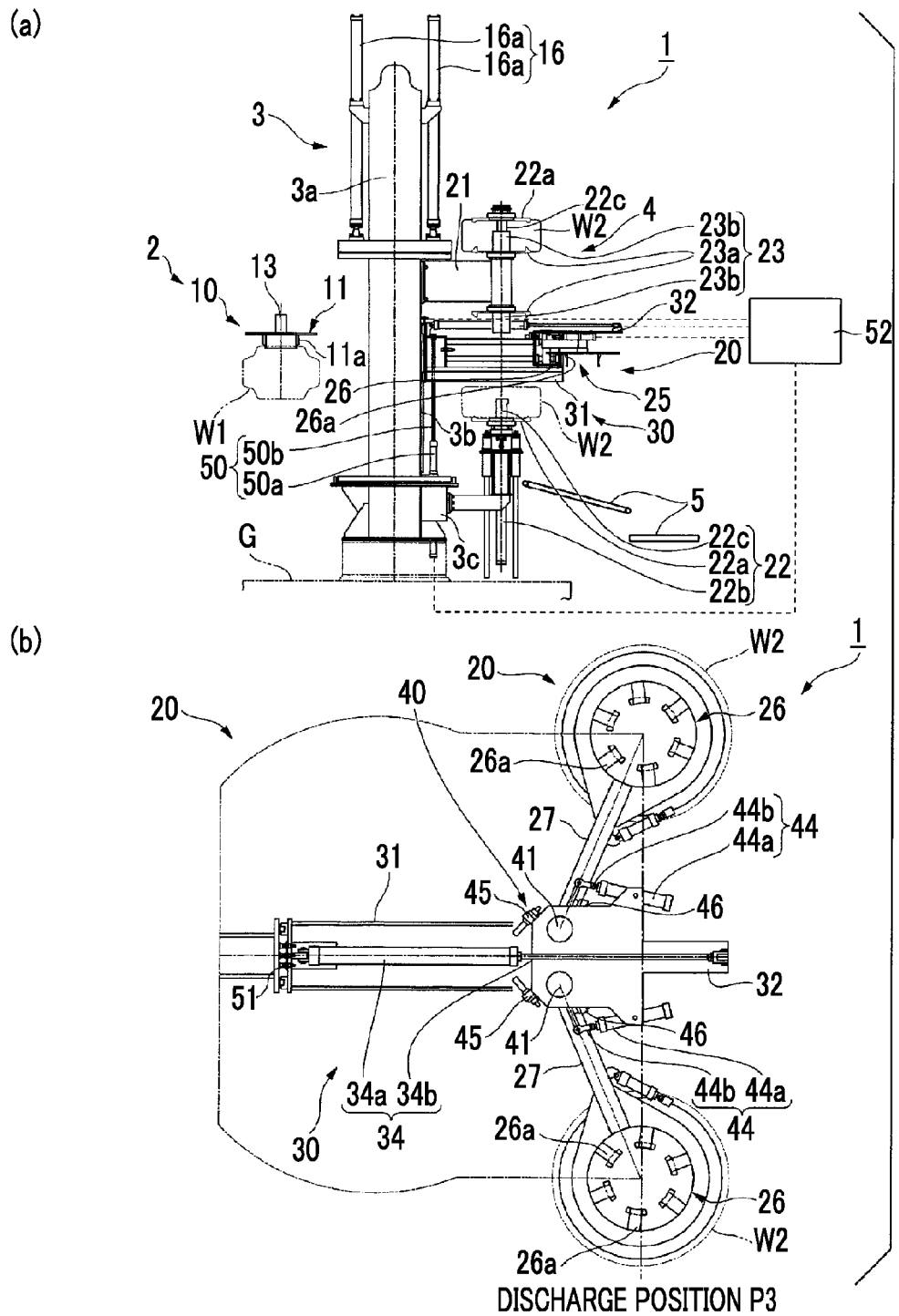

As illustrated in FIGS. 8(*a*) and 8(*b*), the controller 52 drives the elevating section 50 to raise the base 31 of the linear movement section 30 to a position where the vulcanized tire W2 and the unloading chuck 26 do not interfere with each other. Thereafter, the controller 52 drives the slide cylinder 34 of the linear movement section 30 to move the support section 25 to the discharge position P3 and to move the support section 25 to a position that does not influence the cooling process and the inverting operation of the post-cure inflator 4.

Figure 9:
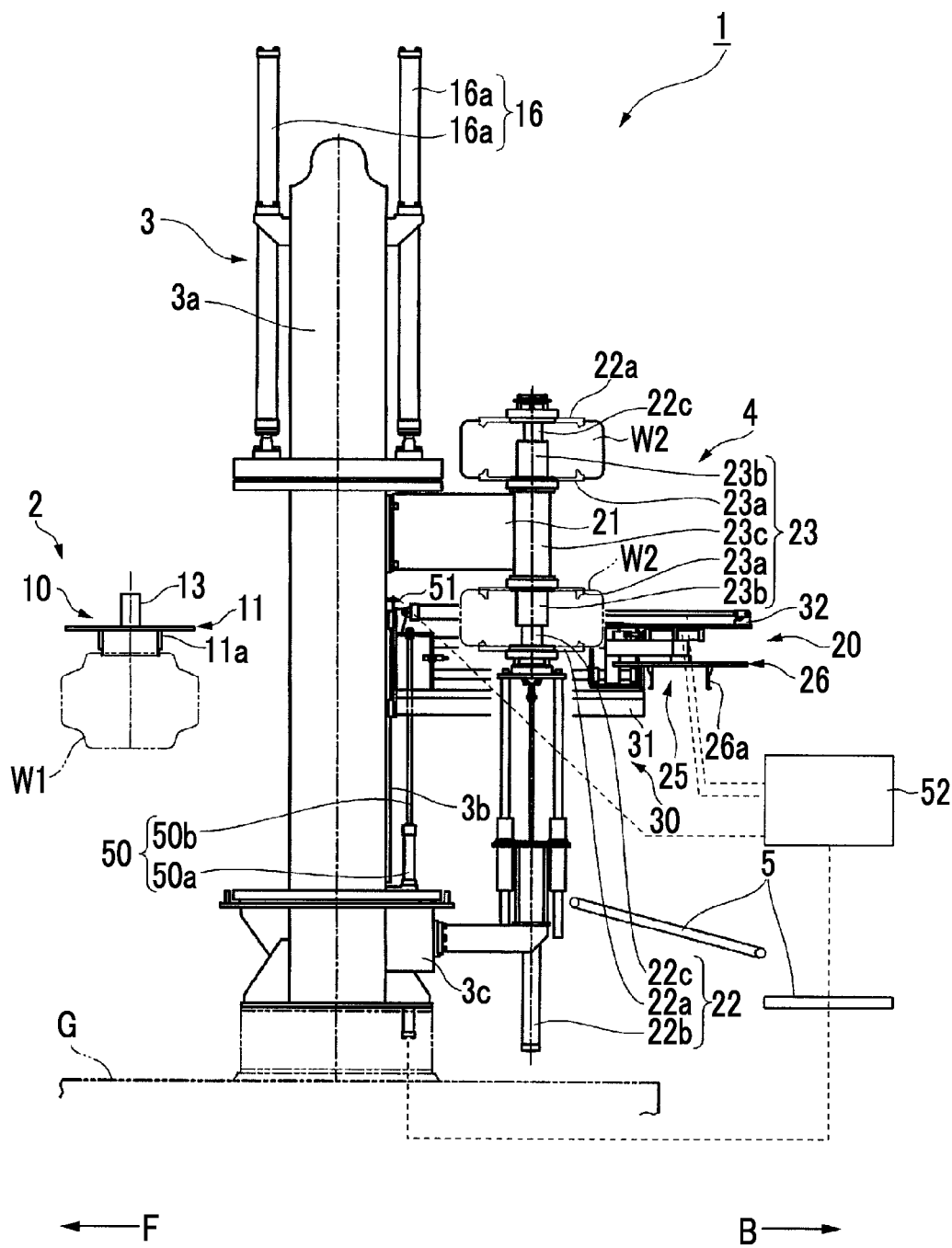
FIG. 9 is a side view of the tire vulcanizer according to the embodiment of the present invention and illustrates a state where the vulcanized tire is set in the post-cure inflator.

Next, as illustrated in FIG. 9, the controller 52 moves the lower rim 22*a* and a lower rim side connection device 22*c* of the lower tire holding section 22 upward using the lower rim elevating device 22*b* and connects an upper rim side connection device 23*b* and the lower rim side connection device 22*c* to each other. Accordingly, the vulcanized tire W2 is interposed between the upper rim 23*a* and the lower rim 22*a* and is held.

In addition, as illustrated in FIG. 10, by vertically inverting the upper tire holding section 23, the cooling process of a plurality of (in this figure, two per one side) vulcanized tires W2 can be performed. In addition, the support section 25 is in a state of being moved to the discharge position P3 as described above.

Here, the cooling process requires a longer amount of time than the vulcanization process, and thus the cooling process of the vulcanized tires W2 is performed vertically sequentially in the upper tire holding section 23. That is, while the cooling process is performed on one side of the upper tire holding section 23, the vulcanized tire W2 after the cooling process ends is discharged to the exporting device 5 by the unloading device 20, and a new vulcanized tire W2 is transported from the vulcanizer main body 3 and the new vulcanized tire W2 is set on the lower tire holding section 22.

Figure 11:
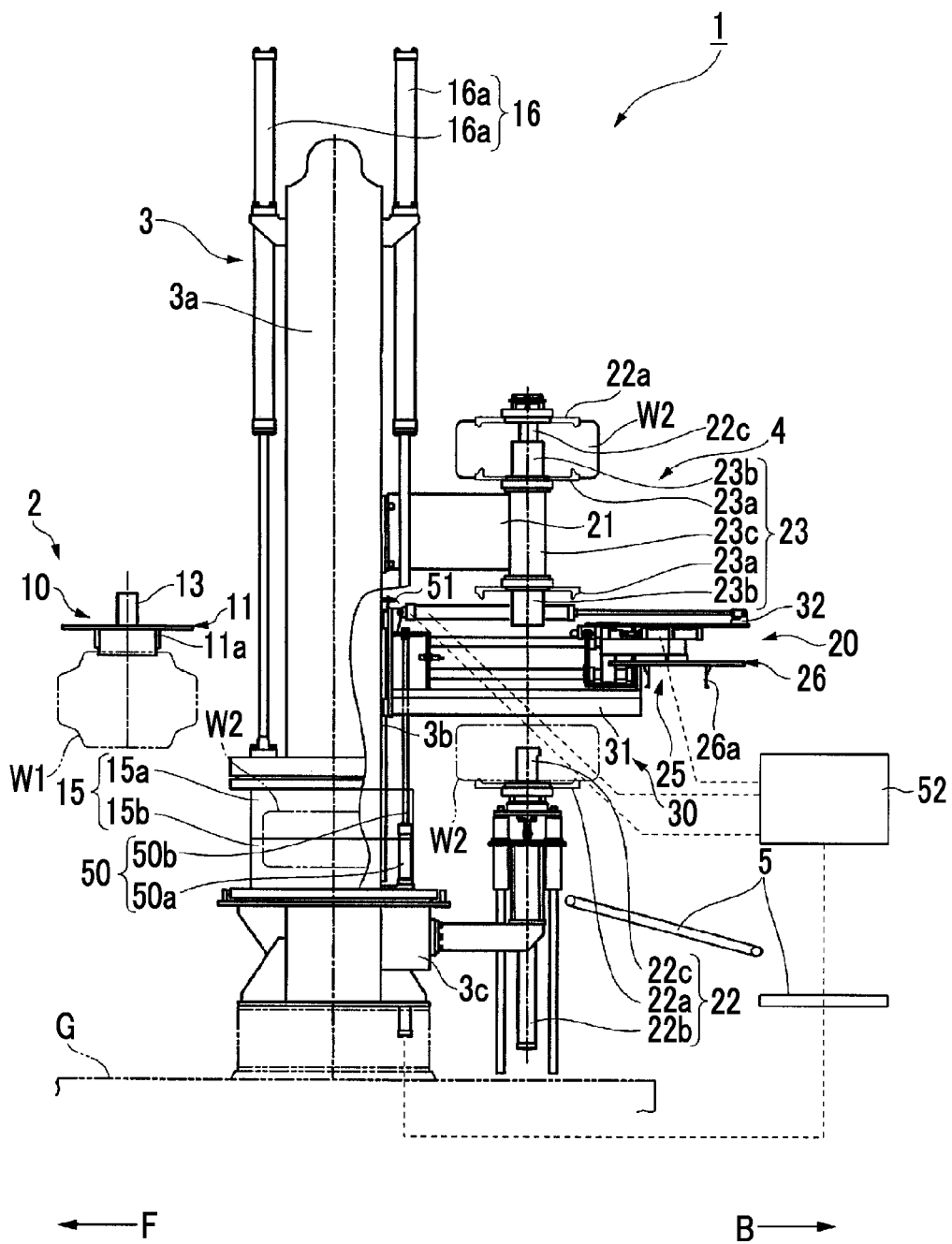
FIG. 11 is a side view of the tire vulcanizer according to the embodiment of the present invention and illustrates a state after the completion of the cooling process of the vulcanized tire in the post-cure inflator.

In addition, as illustrated in FIG. 11, the vulcanized tire W2 held on the lower rim side connection device 22*c* and the lower rim 22*a* is received and the vulcanized tire W2 is moved downward again by the lower rim elevating device 22*b* of the lower tire holding section 22.

Figure 12:
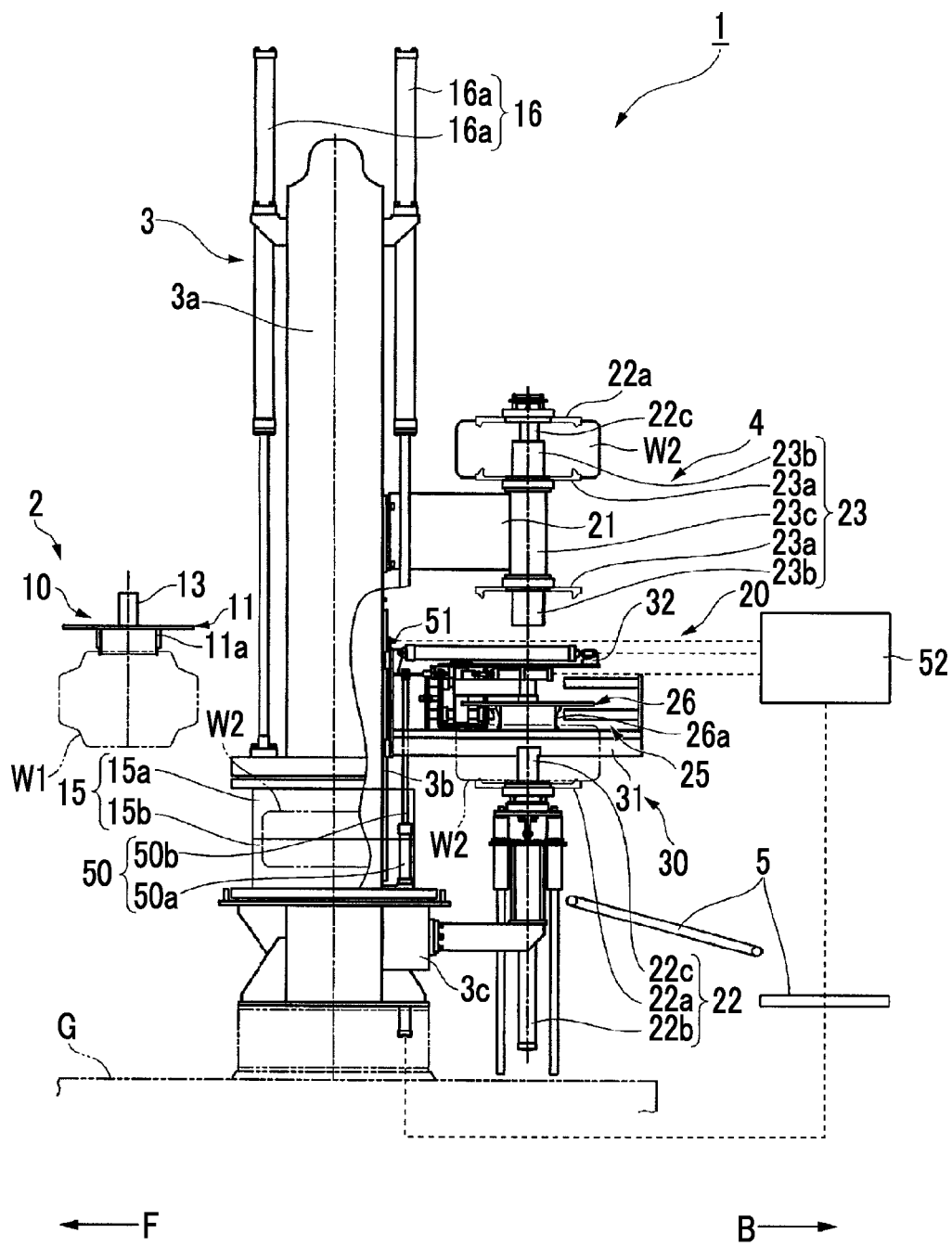
FIG. 12 is a side view of the tire vulcanizer according to the embodiment of the present invention and illustrates a state after the completion of the cooling process and before the start of the transportation of the vulcanized tire.

Next, as illustrated in FIG. 12, the controller 52 drives the slide cylinder 34 of the linear movement section 30 to linearly move the support section 25 to the cooling position P2. Thereafter, the controller 52 drives the elevating section 50 to move the base 31 downward at the cooling position P2 such that the claw 26*a* is squeezed into the bead of the vulcanized tire W2. Thereafter, by widening the claw 26*a*, the claw 26*a* is hooked on the bead and thus the vulcanized tire W2 is supported by the support section 25.

Figure 13:
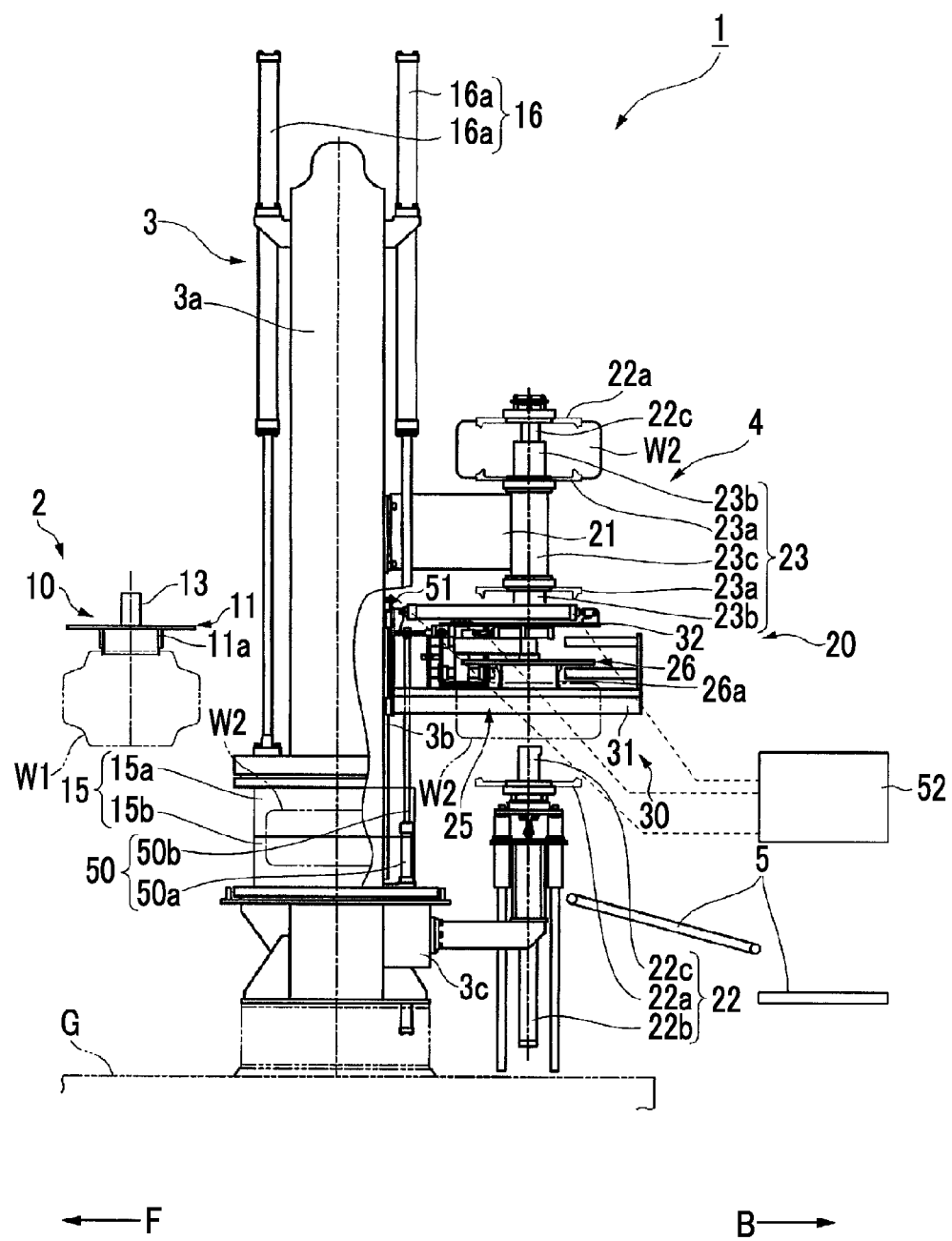
FIG. 13 is a side view of the tire vulcanizer according to the embodiment of the present invention and illustrates a state where the vulcanized tire after being subjected to the cooling process is transported to an exporting device.

In the state where the vulcanized tire W2 is supported by the support section 25, the controller 52 drives the elevating section 50 on the basis of the detection result of the detection unit 51 to move the base 31 of the linear movement section 30 upward at the cooling position P2 as illustrated in FIG. 13.

Figure 14:
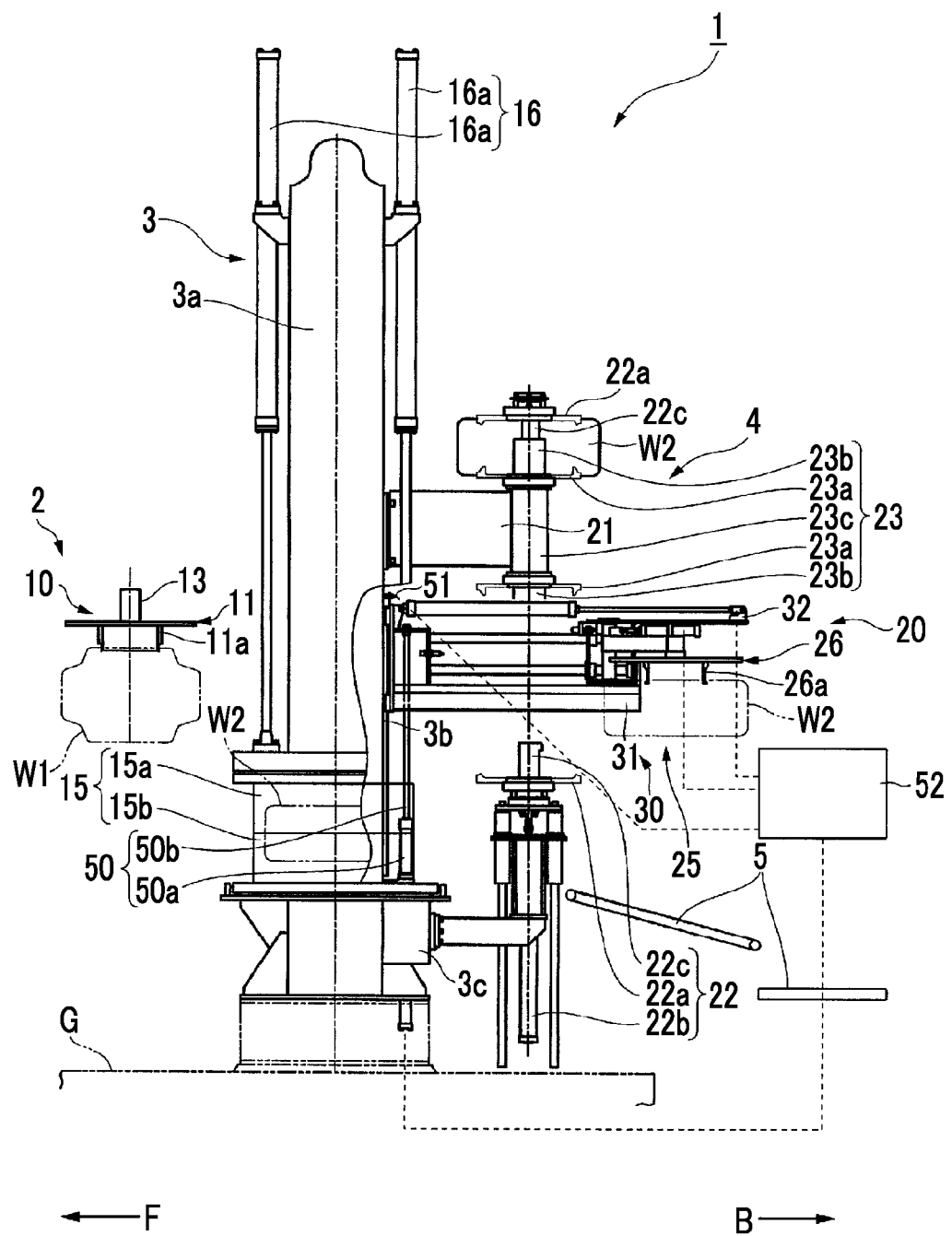
FIG. 14 is a side view of the tire vulcanizer according to the embodiment of the present invention and illustrates a state where the cooled vulcanized tire is transported to the exporting device and a state where the support section is positioned at a discharge position.

Next, in the state where the vulcanized tire W2 is supported by the support section 25, the controller 52 drives the slide cylinder 34 of the linear movement section 30 to move the support section 25 to the discharge position P3 as illustrated in FIG. 14.

Figure 15:
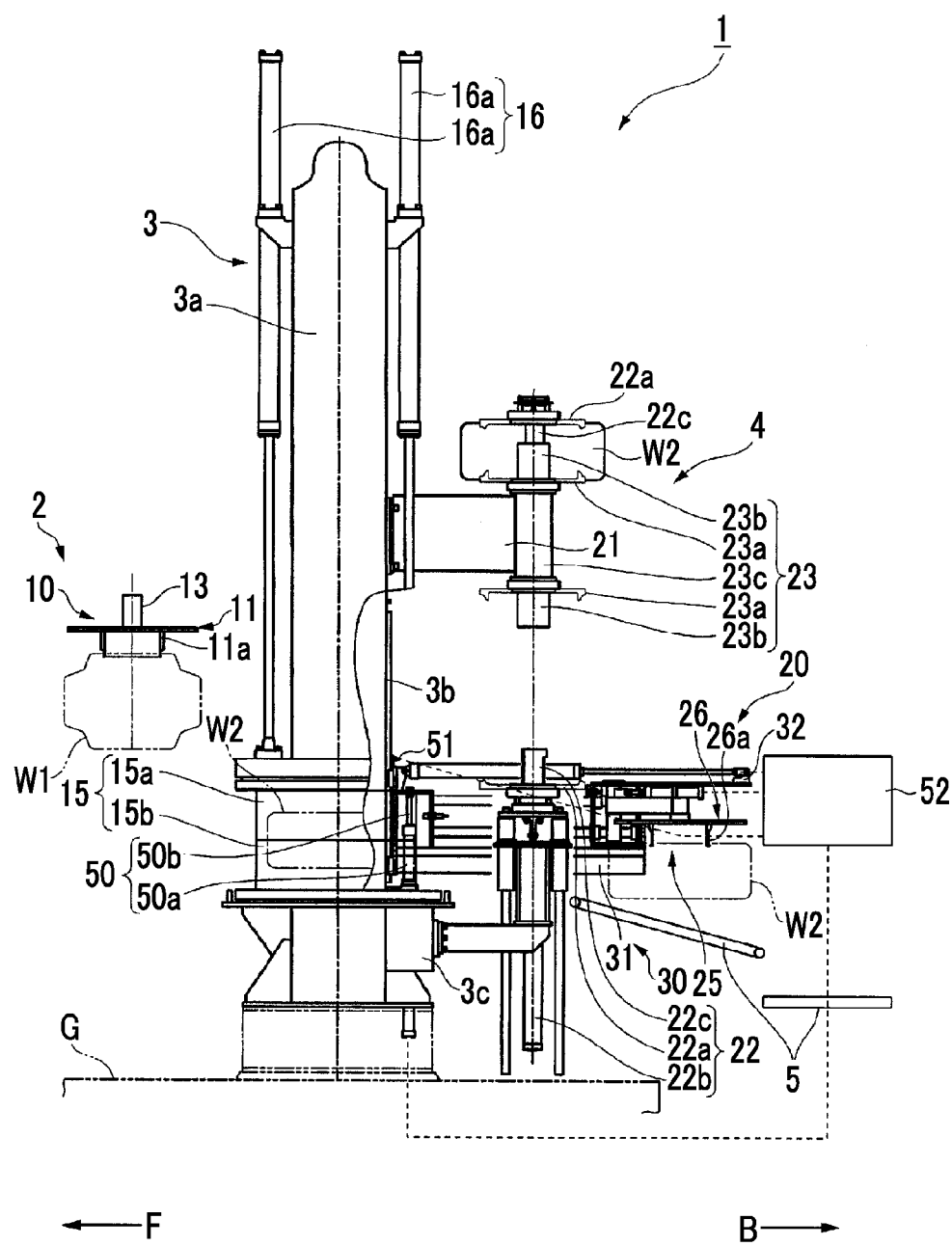
FIG. 15 is a side view of the tire vulcanizer according to the embodiment of the present invention and illustrates a state after the vulcanized tire is transferred to the exporting device.

In addition, in the state where the vulcanized tire W2 is supported by the support section 25, the controller 52 drives the elevating section 50 on the basis of the detection result of the detection unit 51 to move the base of the linear movement section 30 downward at the discharge position P3 as illustrated in FIG. 15.

Figure 16:
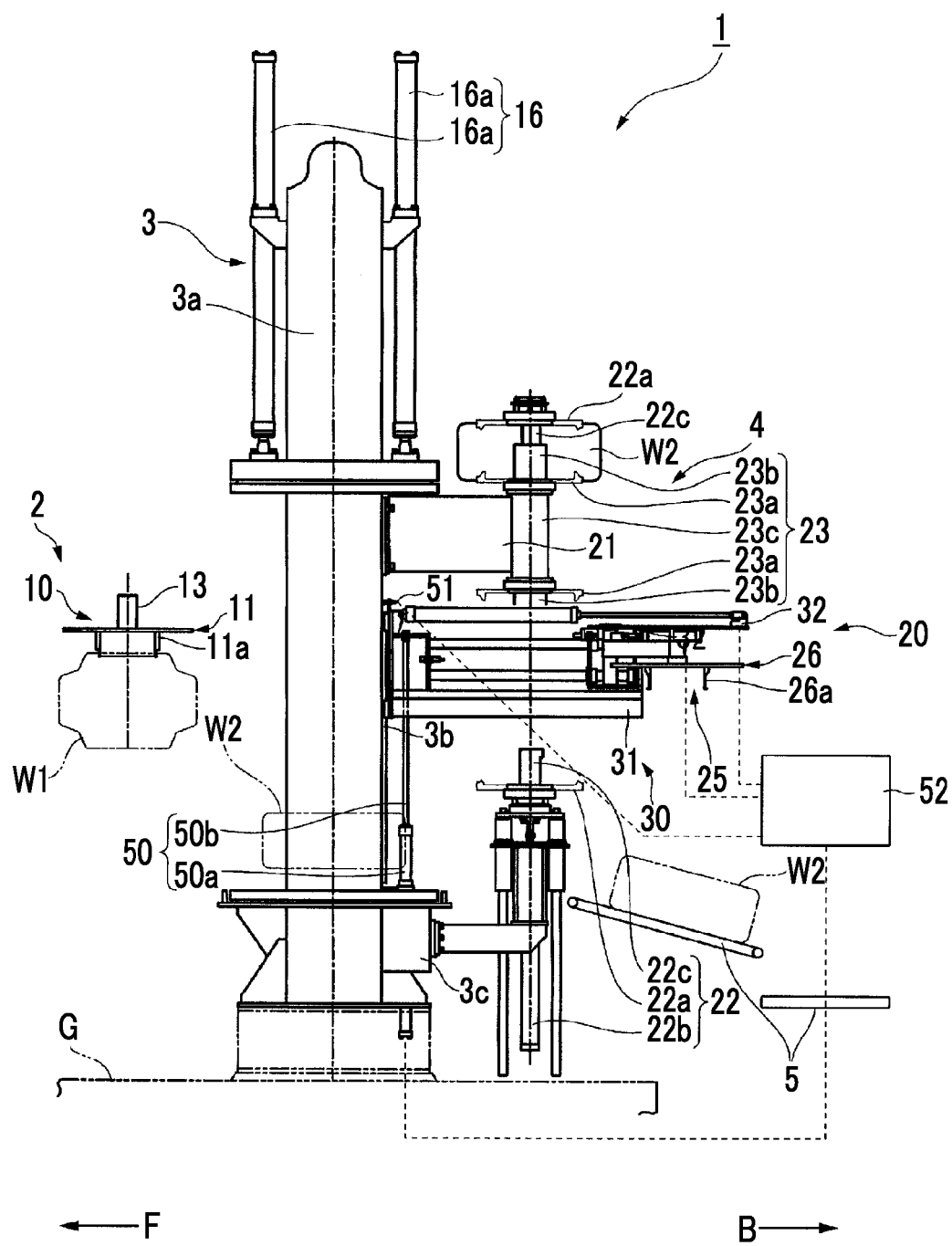
FIG. 16 is a side view of the tire vulcanizer according to the embodiment of the present invention and illustrates a state where the vulcanized tire is discharged from the exporting device.

Last, as illustrated in FIG. 16, the vulcanized tire W2 is transferred from the support section 25 to the exporting device 5 and the vulcanized tire W2 is discharged.

In the tire vulcanizer 1 when the vulcanized tire W2 is supported and transported by the support section 25, transportation as a combination of rotational movement and linear movement can be achieved by the rotational movement section 40 and the linear movement section 30 of the unloading device 20.

Therefore, compared to a case where the vulcanized tire W2 is transported to the cooling position P2 and the discharge position P3 by rotational movement only, interference between device components and the vulcanized tire does not occur during the processes performed on the vulcanized tire by the vulcanizer main body 3, the post-cure inflator 4, and the exporting device 5 even when the length dimensions of the unloading arm 27 of the rotational movement section 40 are suppressed to be small and the rotational radius thereof is reduced.

More specifically, as illustrated in FIG. 17(a), in a case where the vulcanized tire W2 is transported by rotational movement only, the mold position P1, the cooling position P2, and the discharge position P3 cannot be arranged on the same rotational path if the length dimensions of an unloading arm 27A are not set to be greater than those in the case of this embodiment illustrated in FIG. 17(b). On the other hand, in this embodiment, the limitation in which each of the positions has to be disposed on the same rotational path is eliminated, and thus interference does not occur at each of the positions described above even when the unloading arm 27 is shorter than the unloading arm 27A. Therefore, the width dimensions of the entirety of the tire vulcanizer 1 in the right and left directions can be reduced.

Since the length dimensions of the unloading arm 27 are reduced as described above, when a plurality of tire vulcanizers 1 are installed to be adjacent to each other, the installation pitch therebetween can be reduced, and thus the tires output can be increased.

Moreover, since the length dimensions of the unloading arm 27 are reduced, a reduction in the cost of materials can be achieved, and due to a reduction in the bending moment in the unloading arm 27, strength required of the peripheral members that support the rotational center of the arm member in the rotational movement section 40, that is, the slider 32 or the support pin 41 can be suppressed, resulting in a reduction in weight and the cost of materials.

In addition, since the rotational radius of the unloading arm 27 is suppressed to be small, the amount of time required for the transportation of the vulcanized tire W2 can be reduced, and thus the cycle time during tire production can be reduced, resulting in an increase in the tires output.

Moreover, since the rotational movement section 40 is supported by the linear movement section 30, movement as a combination of rotational movement and linear movement can be realized with a simple structure.

In addition, since the elevating section 50 is used, the degree of freedom of the movement paths of the support section 25, the rotational movement section 40, and the linear movement section 30 is increased. Furthermore, since the controller 52 is controlled by the detection unit 51, the support section 25, the rotational movement section 40, and the linear movement section 30 can be moved to appropriate height positions. Therefore, the transfer of the vulcanized tire W2 is reliably performed, and thus the transportation thereof is possible.

In addition, since the post-cure inflator 4 is fixed to the vulcanizer main body 3, the vulcanizer main body 3 and the post-cure inflator 4 can be installed to be close to each other, further reduction in the installation space is possible. In addition, the adjustment of the installation positions of the vulcanizer main body 3 and the post-cure inflator 4 is unnecessary.

Furthermore, there is no need to provide individual unloading devices for the transportation of the vulcanized tire W2 from the vulcanizer main body 3 to the post-cure inflator 4 and from the post-cure inflator 4 to the exporting device 5, resulting in space saving and a reduction in cost.

According to the tire vulcanizer 1 of this embodiment, the support section 25 is moved by a combination of the rotational movement section 40 and the linear movement section 30 in the unloading device 20, and thus a compact size and space saving can be achieved.

While the embodiment of the present invention has been described above in detail, slight changes in design can be made without departing from the technical spirit of the present invention.

For example, the post-cure inflator 4 does not necessarily need to be fixed to the vulcanizer main body 3.

In addition, in the unloading device 20 described above, the rotational movement section 40 is supported by and integrated with the linear movement section 30. However, the rotational movement section 40 and the linear movement section 30 may not necessarily be integrated with each other.

In addition, in the unloading device 20 described above, the vulcanized tire W2 is transported from the mold position P1 to the cooling position P2 by the rotational movement section 40 and is transported from the cooling position P2 to the discharge position P3 by the linear movement section 30. However, the unloading device 20 is not limited thereto, and the vulcanized tire W2 may also be transported from the mold position P1 to the cooling position P2 by the linear movement section 30 and be transported from the cooling position P2 to the discharge position P3 by the rotational movement section 40.

In addition, in the unloading device, the rotational movement section and the linear movement section may have different structures from those described above.

Figure 18:
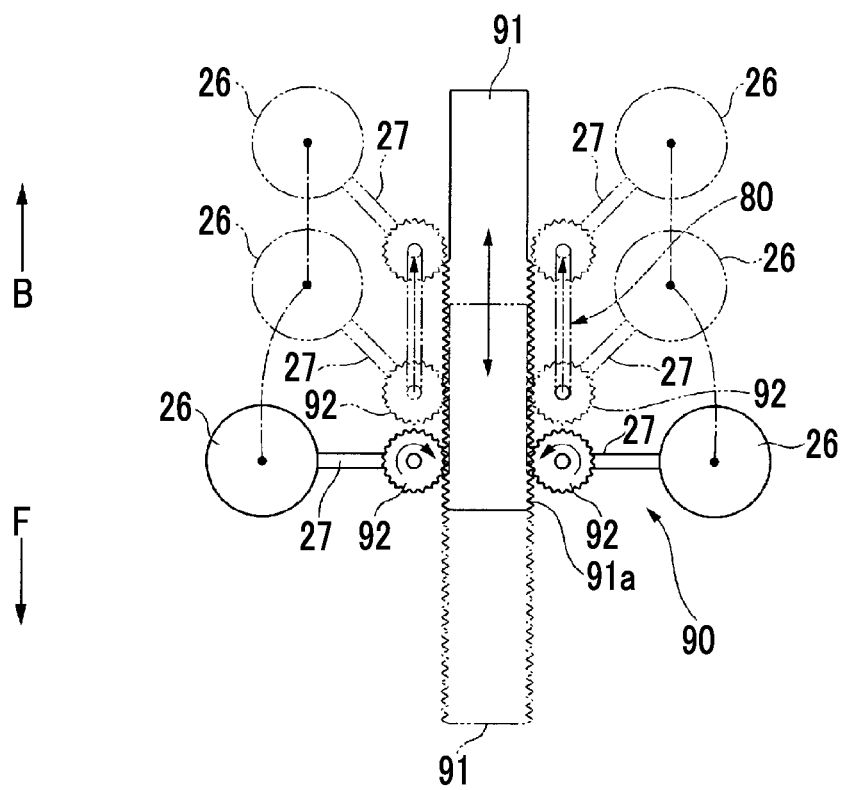
FIG. 18 is a schematic plan view of an unloading device of a tire vulcanizer according to a first modification example of the embodiment of the present invention.

As an example, as illustrated in FIG. 18, the unloading device may include a rotational movement section 90 and a linear movement section 80.

The rotational movement section 90 includes a rack gear 91 which extends in the forward and rearward directions at the center position, and right and left pinion gears 92 which form a pair and are provided to mesh with the rack gear 91 and rotate about the upward and downward directions.

The support section 25 is mounted on each of the pinion gears 92, and the support section 25 is rotated by the forward and rearward movements of the rack gear 91.

The rack gear 91 is provided with teeth 91a in a predetermined range in the forward and rearward directions such that the vulcanized tire W2 supported by the support section 25 is rotated by the forward movement of the rack gear 91 itself and when the vulcanized tire W2 is positioned at the cooling position P2, the meshing of the rack gear 91 and the pinion gear 92 is released.

In addition, the linear movement section 80 includes a cylinder (not illustrated) which slidably moves the support section 25 toward the rear of each of the pinion gears 92 in the state where the meshing of the rack gear and the pinion gear 92 is released at the cooling position P2 as described above.

As still another example, the unloading device may include rotational and linear movement sections 100 and 110 (see FIGS. 19 and 20) which transport the vulcanized tire W2 by allowing the vulcanized tire W2 to linearly move while rotating.

Figure 19:
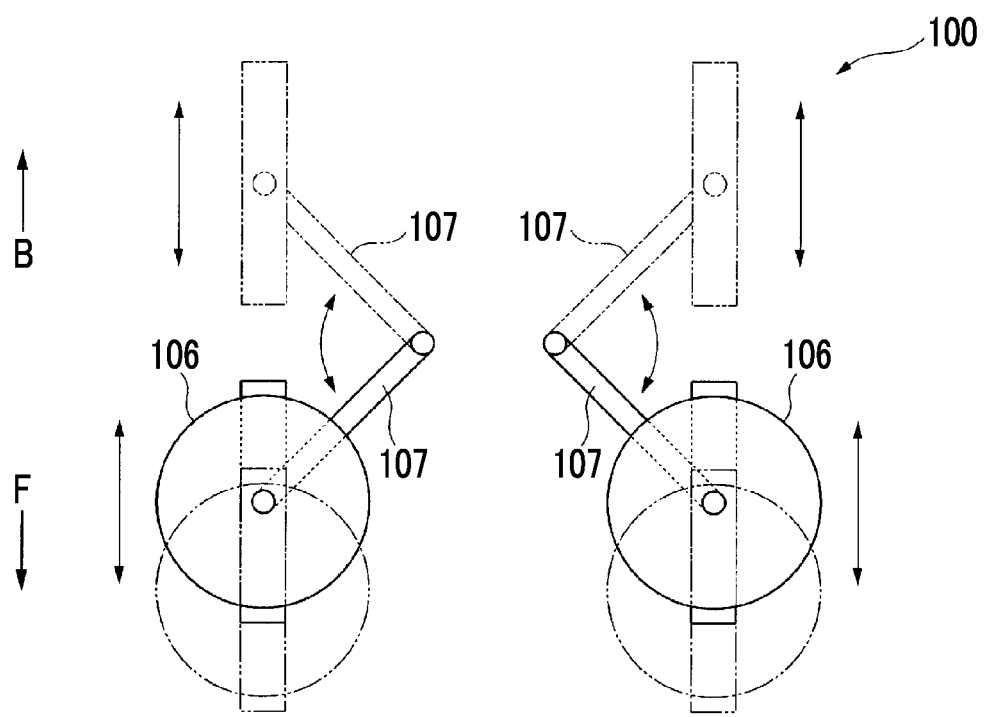
FIG. 19 is a schematic plan view of an unloading device of a tire vulcanizer according to a second modification example of the embodiment of the present invention.

Specifically, as illustrated in FIG. 19, in the rotational and linear movement section 100, while an unloading arm 107 is rotated, an unloading chuck 106 slides in the forward and rearward directions at the tip end of the unloading arm 107 on the outside in the radial direction thereof.

Figure 20:
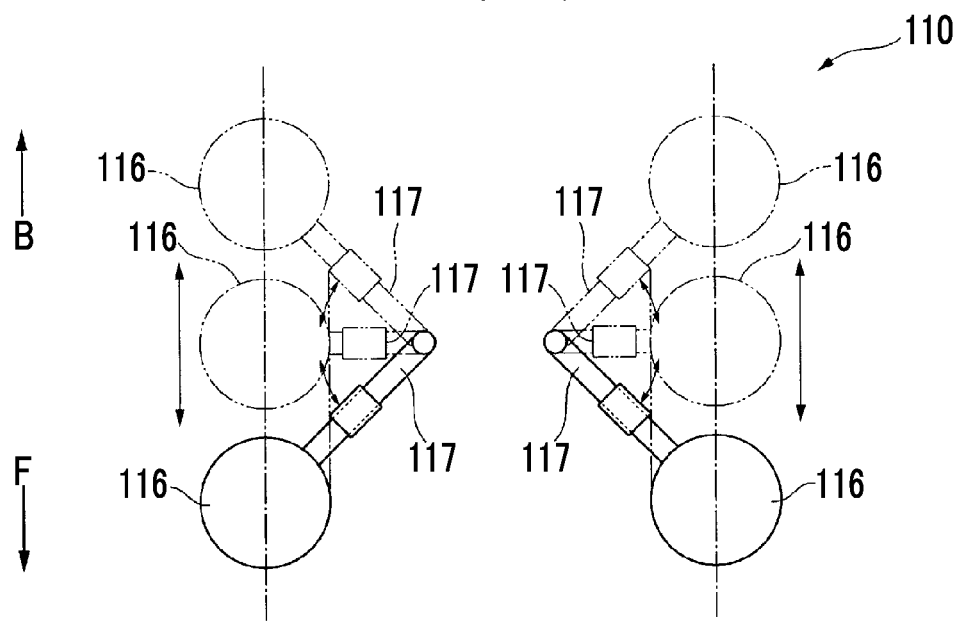
FIG. 20 is a schematic plan view of an unloading device of a tire vulcanizer according to a third modification example of the embodiment of the present invention.

In addition, as illustrated in FIG. 20, in the rotational and linear movement section 110, when an unloading arm 117 is rotated, the length dimension of the unloading arm 117 is changed by a cylinder or the like. Accordingly, even during the rotation, an unloading chuck 116 is always positioned at the same position in the right and left directions.

Figure 21:
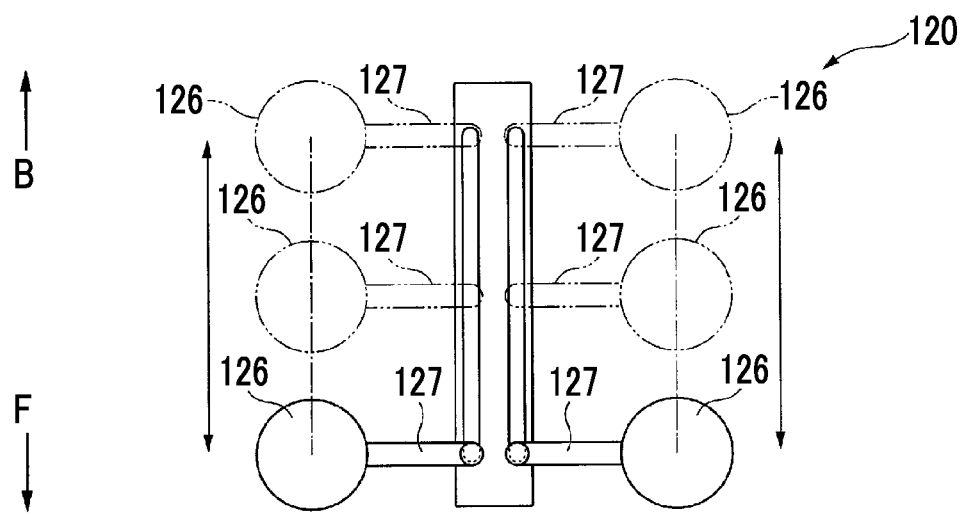
FIG. 21 is a schematic plan view of an unloading device of a tire vulcanizer according to a fourth modification example of the embodiment of the present invention.

As still another example, as illustrated in FIG. 21, the unloading device does not include a rotational movement section and may include a linear movement section 120 which supports an unloading arm 127 with the end portions thereof on the center position side in the right and left directions and moves an unloading chuck 126 in the forward and rearward directions.

As described above, the vulcanized tire W2 is transported by linear movement only without rotational movement, and thus the width dimension of the tire vulcanizer 1 in the right and left directions can be reduced, resulting in a compact size. In addition, when a plurality of tire vulcanizers 1 are installed to be adjacent to each other, the installation pitch therebetween in the right and left directions can be reduced, and thus space saving in the right and left directions can be achieved.

Here, the above-described linear movement sections 30, 80, and 120, the rotational movement section 90, and the rotational and linear movement sections 100 and 110 may also be applied to the loading device 10.

In addition, the linear movement section 30 and the rotational movement section 40 may also be driven by a single drive source. Similarly, the linear movement section 80 and the rotational movement section 90, and the rotational and linear movement sections 100 and 110 may also be driven by single drive sources in the same manner.

INDUSTRIAL APPLICABILITY

According to an aspect of the present invention, a compact size of the devices and space saving can be achieved.

REFERENCE SIGNS LIST

1 TIRE VULCANIZER
2 IMPORTING DEVICE
3 VULCANIZER MAIN BODY
3a GUIDE FRAME
3b GUIDE RAIL
3c MOUNTING PORTION
4 POST-CURE INFLATOR
5 EXPORTING DEVICE
10 LOADING DEVICE
11 LOADING CHUCK
11a CLAW
13 LOADING ARM
15 MOLD (MOLD)
15a UPPER MOLD (MOLD)
15b LOWER MOLD (MOLD)
16 UPPER MOLD ELEVATING DEVICE
16a CYLINDER
20 UNLOADING DEVICE
21 SUPPORT FRAME
22 LOWER TIRE HOLDING SECTION
22a LOWER RIM
22b LOWER RIM ELEVATING DEVICE
22c LOWER RIM SIDE CONNECTION DEVICE
23 UPPER TIRE HOLDING SECTION
23a UPPER RIM
23b UPPER RIM SIDE CONNECTION DEVICE
25 SUPPORT SECTION
26 UNLOADING CHUCK
26a CLAW
27, 27A UNLOADING ARM
30 LINEAR MOVEMENT SECTION
31 BASE
31a SLIDE GUIDE
31b ELEVATING GUIDE
32 SLIDER
34 SLIDE CYLINDER
34a FIRST CYLINDER MAIN BODY
34b FIRST ROD
40 ROTATIONAL MOVEMENT SECTION
41 SUPPORT PIN
44 SWING CYLINDER
44a SECOND CYLINDER MAIN BODY
44b SECOND ROD
45 FIRST STOPPER
46 SECOND STOPPER
50 ELEVATING SECTION
50a ELEVATING CYLINDER MAIN BODY
50b ELEVATING ROD
51 DETECTION UNIT
52 CONTROLLER
W1 GREEN TIRE
W2 VULCANIZED TIRE
G FLOOR
P0 IMPORTING POSITION
P1 MOLD POSITION
P2 COOLING POSITION
P3 DISCHARGE POSITION
80 LINEAR MOVEMENT SECTION
90 ROTATIONAL MOVEMENT SECTION
91 RACK GEAR
91a TEETH
92 PINION GEAR
100 ROTATIONAL AND LINEAR MOVEMENT SECTION
106 UNLOADING CHUCK
107 UNLOADING ARM
110 ROTATIONAL AND LINEAR MOVEMENT SECTION
116 UNLOADING CHUCK
117 UNLOADING ARM
120 LINEAR MOVEMENT SECTION
126 UNLOADING CHUCK
127 UNLOADING ARM

The invention claimed is:

1. An unloading device of a tire vulcanizer in which a vulcanized tire vulcanized by a vulcanizer main body is taken out of a mold installed in the vulcanizer main body and is transported to a cooling position at which the vulcanized tire is cooled, and the vulcanized tire cooled at the cooling position is transported to a discharge position for transfer to an exporting device for discharging the vulcanized tire, the unloading device comprising:

a guide frame extending vertically;
a base extending horizontally which is mounted to the guide frame;
a rotational movement section including a rack gear which is mounted to the base and a pinion gear provided to mesh with teeth provided on a lateral side of the rack gear and rotate about a vertical axis;
a support section mounted on the pinion gear and configured to support the vulcanized tire; and
a linear movement section which is mounted to the base, the linear movement section being configured to linearly move the rack gear which is provided above the base in a direction away from or toward the guide frame,
wherein the teeth provided on the rack gear are formed in a predetermined range such that meshing of the rack gear and the pinion gear is released when the vulcanized tire supported by the support section is rotated and positioned at the cooling position, wherein the linear movement section includes a cylinder configured to linearly move the support section with the pinion gear in a state that the meshing of the rack gear and the pinion gear is released at the cooling position, and wherein the rotational movement section is configured to rotate the support section in a plan view by rotation of the pinion gear when the linear movement section linearly moves the rack gear.

2. The unloading device of a tire vulcanizer according to claim 1, wherein the linear movement section is able to move along a direction toward the discharge position from the vulcanizer main body.

3. The unloading device of a tire vulcanizer according to claim 2, wherein the rotational movement section rotates the vulcanized tire from a position where the vulcanized tire is taken out of the mold, to the cooling position, and the linear movement section linearly moves the vulcanized tire from the cooling position to the discharge position.

4. The unloading device of a tire vulcanizer according to claim 3, further comprising:

an elevating section which vertically elevates the linear movement section.

5. The unloading device of a tire vulcanizer according to claim 4, further comprising:

a detection unit which detects a height position of the linear movement section; and a controller which controls the elevating section on the basis of the height position detected by the detection unit.

6. The unloading device of a tire vulcanizer according to claim 1, wherein the support section is rotated by the forward and rearward movements of the rack gear.

7. A tire vulcanizer comprising:

the unloading device according to claim 1;

the vulcanizer main body which performs vulcanization on a green tire which is not vulcanized;

a post-cure inflator which cools the vulcanized tire vulcanized by the vulcanizer main body, at the cooling position; and an exporting device for discharging the vulcanized tire cooled at the cooling position.

8. The tire vulcanizer according to claim 7, wherein the post-cure inflator is fixed to the vulcanizer main body.

* * * * *